United States Patent
Lawrie-Fussey et al.

(10) Patent No.: US 10,366,550 B2
(45) Date of Patent: Jul. 30, 2019

(54) VIBRATION MONITORING DEVICE FOR VEHICLE COMPONENTS

(71) Applicant: CAMBRIDGE CONSULTANTS LIMITED, Cambridge, Cambridgeshire (GB)

(72) Inventors: Thomas Lawrie-Fussey, Cambridge (GB); Jonathan Edgcombe, Cambridge (GB)

(73) Assignee: CAMBRIDGE CONSULTANTS LIMITED, Cambridge, Cambridgeshire (GB)

( * ) Notice: Subject to any disclaimer, the term of this patent is extended or adjusted under 35 U.S.C. 154(b) by 0 days.

(21) Appl. No.: 15/115,585

(22) PCT Filed: Feb. 2, 2015

(86) PCT No.: PCT/GB2015/050279
§ 371 (c)(1),
(2) Date: Jul. 29, 2016

(87) PCT Pub. No.: WO2015/114384
PCT Pub. Date: Aug. 6, 2015

(65) Prior Publication Data
US 2017/0069144 A1    Mar. 9, 2017

(30) Foreign Application Priority Data

Jan. 31, 2014  (WO) ............... PCT/GB2014/050277
May 6, 2014   (GB) .................................. 1407950.3
May 6, 2014   (GB) .................................. 1407952.9

(51) Int. Cl.
*G07C 5/08*    (2006.01)
*G07C 5/00*    (2006.01)
(Continued)

(52) U.S. Cl.
CPC ............. *G07C 5/085* (2013.01); *G06Q 10/00* (2013.01); *G06Q 10/083* (2013.01);
(Continued)

(58) Field of Classification Search
CPC ................................................... G01C 21/165
See application file for complete search history.

(56) References Cited

U.S. PATENT DOCUMENTS 8,498,777 B2 * 7/2013 Sanchez-Prieto Aler ...................
   B60W 40/10
   340/988
8,935,038 B2 * 1/2015 Chinnadurai .......... G07C 5/008
   701/31.4
(Continued)

FOREIGN PATENT DOCUMENTS

EP    1020813 A2   7/2000
FR    2912235 A1   8/2008
(Continued)

OTHER PUBLICATIONS

International Search Report for PCT/GB2015/050279, dated May 11, 2015.
(Continued)

*Primary Examiner* — Todd M Melton
(74) *Attorney, Agent, or Firm* — Merchant & Gould P.C.

(57) ABSTRACT

A monitoring apparatus provides vehicle telematics data. The monitoring apparatus includes a sensor for sensing vehicle and engine motion induced vibration in part of a vehicle and for generating vibration associated data. The sensor is coupled to part of the vehicle. Engine motion induced vibration associated data is processed to extract a characteristic of the vehicle or the engine.

19 Claims, 16 Drawing Sheets

(51) Int. Cl.
  *G06Q 10/00* (2012.01)
  *H04W 4/04* (2009.01)
  *G06Q 10/08* (2012.01)

(52) U.S. Cl.
  CPC ..... *G06Q 10/0832* (2013.01); *G06Q 10/0833* (2013.01); *G06Q 10/20* (2013.01); *G07C 5/008* (2013.01); *H04W 4/046* (2013.01)

(56) References Cited

U.S. PATENT DOCUMENTS

| | | |
|---|---|---|
| 2005/0171738 A1 | 8/2005 | Kadaba |
| 2007/0216521 A1 | 9/2007 | Guensler et al. |
| 2007/0239321 A1 | 10/2007 | McAden |
| 2007/0250245 A1 | 10/2007 | van der Merwe et al. |
| 2008/0071428 A1 | 3/2008 | Kim |
| 2008/0294690 A1 | 11/2008 | McClellan et al. |
| 2009/0140861 A1 | 6/2009 | Caliri et al. |
| 2009/0179739 A1 | 7/2009 | Kim et al. |
| 2010/0013639 A1 | 1/2010 | Revert |
| 2010/0049398 A1* | 2/2010 | Bryant .............. G01P 1/127 701/31.4 |
| 2010/0315203 A1 | 12/2010 | Peden, II et al. |
| 2011/0060496 A1 | 3/2011 | Nielsen et al. |
| 2011/0163850 A1 | 7/2011 | Bachman et al. |
| 2012/0136619 A1* | 5/2012 | Huang .............. B60R 21/0132 702/141 |
| 2012/0226390 A1 | 9/2012 | Adams et al. |
| 2013/0211737 A1 | 8/2013 | Batcheller et al. |
| 2015/0039269 A1* | 2/2015 | Mejegard .............. G06Q 10/06 702/182 |
| 2015/0247729 A1* | 9/2015 | Meduna .............. H04W 4/027 702/150 |

FOREIGN PATENT DOCUMENTS

| | | |
|---|---|---|
| GB | 2471727 A | 1/2011 |
| GB | 2506365 A | 4/2014 |
| WO | 2008/062257 A2 | 5/2008 |
| WO | 2009/068983 A2 | 6/2009 |
| WO | 2014/047641 A1 | 3/2014 |
| WO | 2014/058964 A1 | 4/2014 |
| WO | 2014/084785 A1 | 6/2014 |
| WO | 2014/143823 A1 | 9/2014 |

OTHER PUBLICATIONS

International Search Report for PCT/GB2014/050277 (dated Jun. 2, 2014).

Search Report for British Patent Application No. 1301710.8 (dated May 1, 2013).

Search Report for British Patent Application No. 1407950.3 (dated Nov. 7, 2014).

Search Report for British Patent Application No. 1407952.9 (dated Nov. 7, 2014).

* cited by examiner

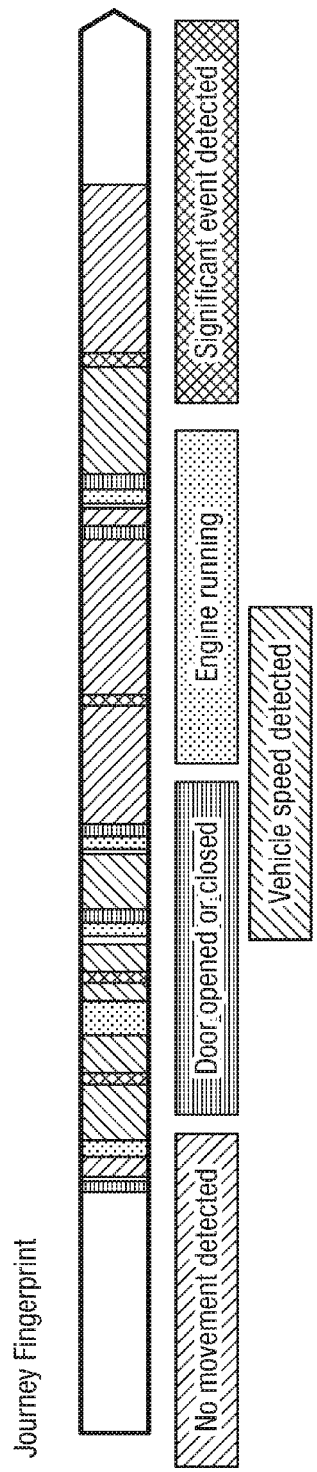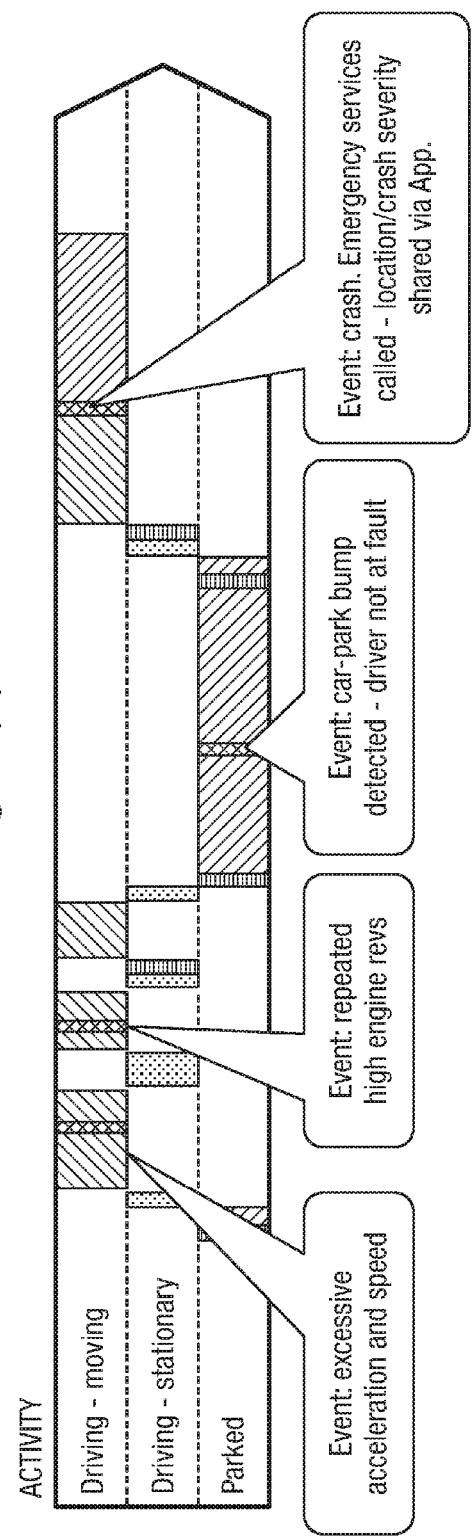

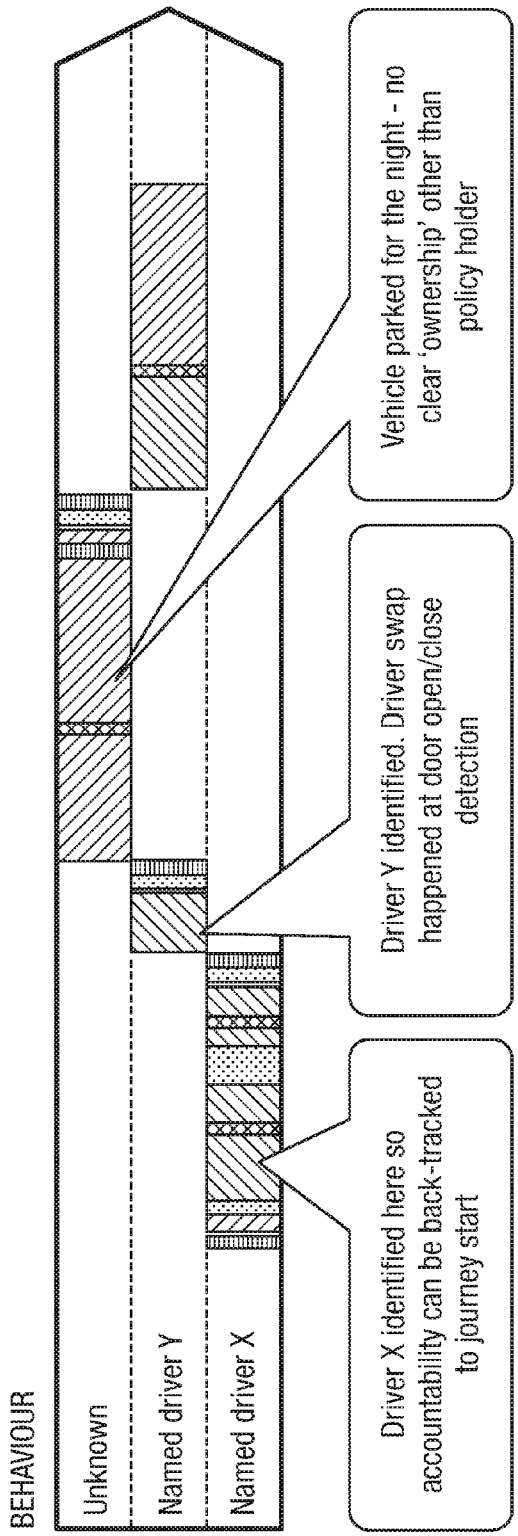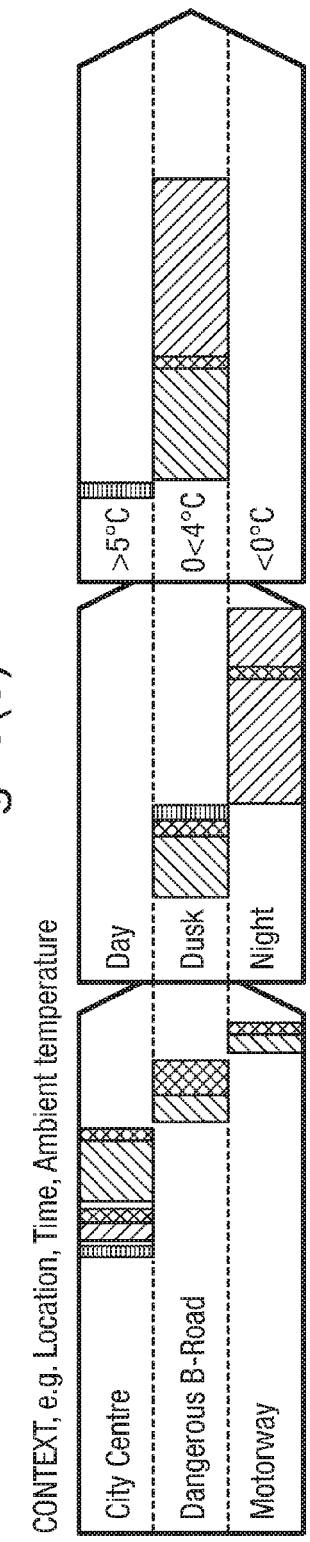

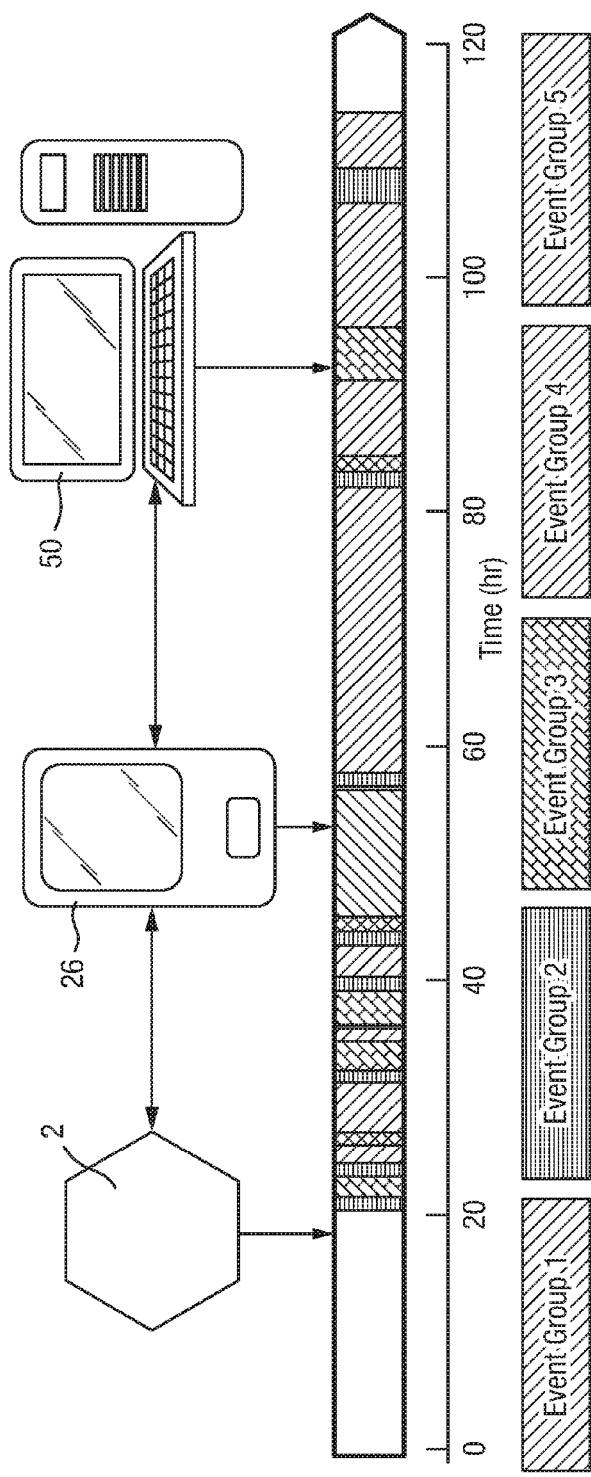
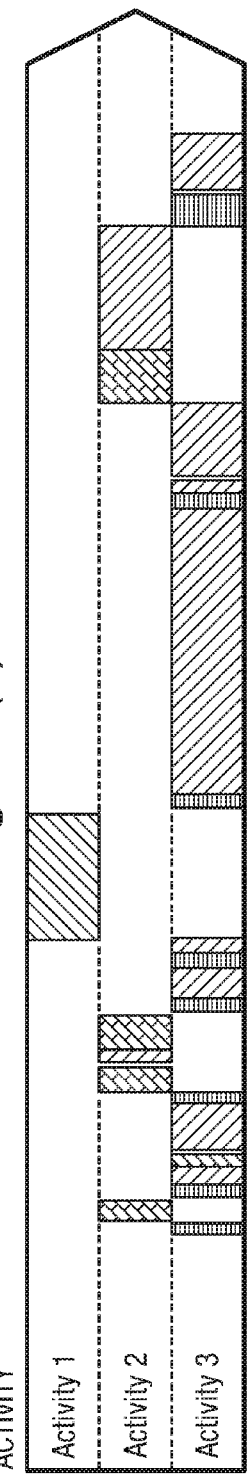
Fig. 12(a)
Fig. 12(b)

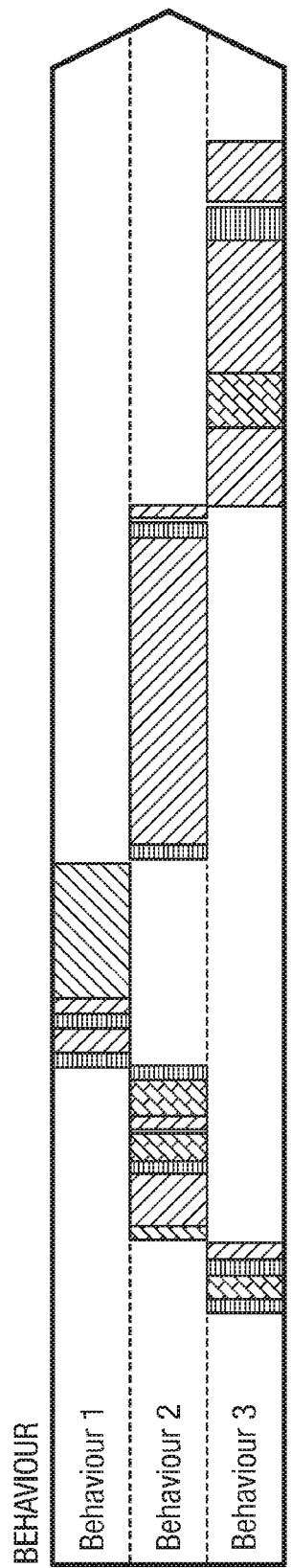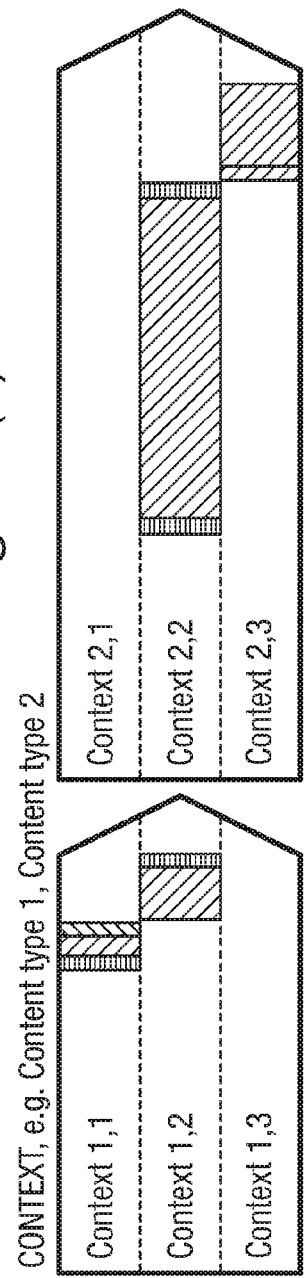

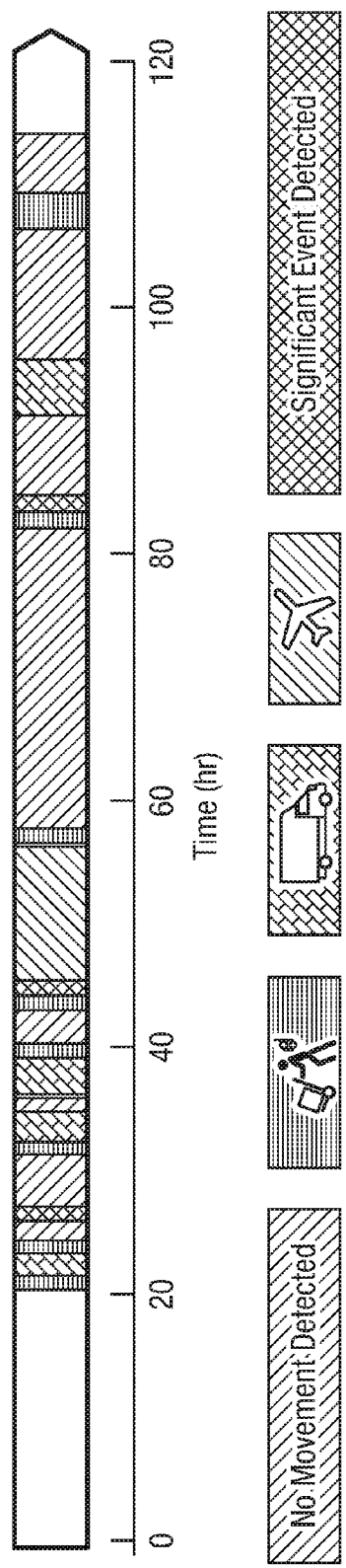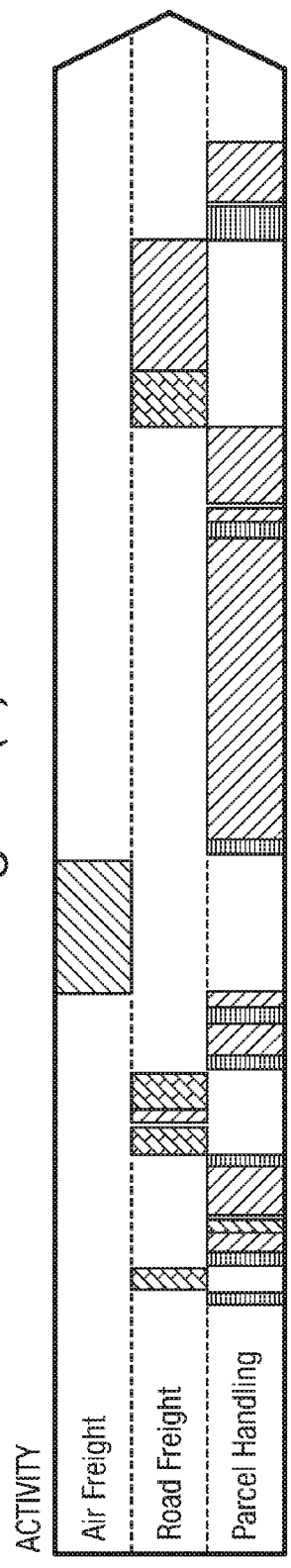
Fig. 13(a)
Fig. 13(b)

VIBRATION MONITORING DEVICE FOR VEHICLE COMPONENTS

This application is a National Stage of PCT/GB2015/050279, filed 2 Feb. 2015, which claims benefit of PCT/GB2014/050277, filed 31 Jan. 2014 in Great Britain, 1407950.3, filed 6 May 2014 in Great Britain, and 1407952.9, filed 6 May 2014 in Great Britain, which applications are incorporated herein by reference. To the extent appropriate, a claim of priority is made to each of the above disclosed applications.

BACKGROUND OF THE INVENTION

The present invention relates to a device for attachment to, or embedding within an article for monitoring the article, or apparatus that the article forms part of. The invention has particular, though not exclusive, relevance to a device for securing to part of a vehicle for monitoring vehicle telemetry and/or the way in which vehicle is handled during use.

Currently there are a number of telematics 'black-box' devices available that can be installed within a vehicle, such as a car or a lorry, to allow information relating to the way in which the vehicle is driven (such as speed, acceleration, breaking, location, time-of-day, distance traveled etc.) and/or other vehicle related telemetry to be acquired and analysed. These devices routinely make use of Global Positioning System (GPS) and Inertial Motion Units (IMU) to determine the location and driving characteristics for a vehicle.

Typically, for example, such devices are installed in a vehicle on behalf of an insurer, fleet manager, or the owner of the vehicle, to enable monitoring of how well the vehicle is driven and to check that any usage conditions, such as restrictions on when and where vehicle can be driven, are met. The device can also be used to provide useful data in the event of an accident such as the speed being driven, whether the brakes were applied and/or other evasive action taken and/or whether collision impact was sufficient to cause certain types of injury.

In the case of insurance related systems, the owner of the vehicle (or other person who insures it), has the potential to receive significantly reduced premiums especially when the vehicle is analysed to be driven in a low risk manner compared to the normal risk associated with the risk profile of the driver (e.g. age, gender, previous claim history, etc.).

In other scenarios, owners of vehicles that are driven by others (e.g. company owners of lorry or other vehicle fleets such as vehicle hire companies, companies providing company cars to employees, haulage companies, delivery companies etc.), can use the black-box devices inter alia to monitor how their vehicle is being driven, whether a driver is 'eco-driving' to meet regulations or decrease fuel costs and/or whether a driver is complying with any specific conditions imposed on them (e.g. conditions on distance traveled, locations visited, times driven and/or the like).

There are two main types of black box, one is connected via an on-board diagnostics port (OBDII) connector, and the other is a specialist fitted standalone black box.

OBDII connected black boxes connect to a vehicle's controller area network (CAN) bus to listen for CAN data, such as vehicle speed etc. Such black boxes can potentially be fitted by a knowledgeable customer and are typically fitted somewhere under the dash or glovebox.

A specialist fitted black-box is generally more focused towards anti-theft and high risk drivers/cars. Such a black-box can be fitted almost anywhere on a vehicle, but needs to be wired into the power supply of the car (and often the ignition/alarm feeds). The specialist fitted black-box is, however, largely independent of the vehicle's own systems. For example, a specialist fitted black-box will often have its own GPS, modem/SIM, acceleration sensors, and gyroscope, will be tamper proof, and will often have an ability to initiate a tracker or similar service.

Whilst black-box devices are relatively small and lightweight, they are relatively expensive to purchase and install (especially those requiring specialist installation). In the insurance case, this may require additional insurance premiums to cover this cost or an upfront fee. In vehicle fleet case this represents a relatively high cumulative overhead. There may also be costs associated with the removal of the black-box device when no longer required or appropriate, for example when the vehicle is sold, the main driver and/or insurer is changed, and/or the driving profile of an existing driver no longer warrants the use of the black-box device.

Driver smart-phone apps are more commonplace, as these can simply be downloaded by drivers onto their own smart-device as part of a reduced-premium offer/option. The internal GPS in the smart-phone is then used by the app to derive vehicle usage data that can be uploaded to the insurer's server. In this case, as with the black box devices, the GPS allows a number of characteristics to be monitored including: how many miles a vehicle is driven; what sort or areas the vehicle is parked in; what sort of roads are driven along and at what speeds (which can be cross referenced with speed limits); what time of day the vehicle is being driven at (late at night or the rush hour for example); and potentially, by cross referencing with weather forecasts, in what conditions the vehicle is driven.

GPS however is not particularly suitable for monitoring the style of driving due to the low data rate (<2 Hz) not picking up the fine detail of maneuvers and is relatively power intensive when being used substantially continuously which can potentially drain a smart-phone's battery quickly, and can reduce overall battery life. While some smart-phones have accelerometers, uncertainties surrounding the phones placement and orientation in the vehicle limit their benefit.

BRIEF SUMMARY OF THE INVENTION

The present invention aims to provide an improved monitoring apparatus and potentially at least one associated method that overcomes or at least alleviates some of the above issues.

In one embodiment an improved monitoring device is provided in which the device (or a sensor thereof) is configured for attachment to a vehicle windscreen (or 'windshield') to allow measurement, via the vibrations induced to the windscreen (or other part of the vehicle) during vehicle use, driving and other vehicle usage related parameters such as driving economy and risk. The device enables vehicle driving styles to be assessed and relayed via a user communications device such as a smart-phone or the like. This could for example be used to provide data as part of a variable insurance policy based on use. Such a device may include sensors such as accelerometers to monitor driving behaviour related parameters including, not only g-forces induced on the device, but also vibrational characteristics relating to engine revolutions per minute (RPM), wheel RPM and/or other automotive data that can be derived from the vibration characteristics of the windscreen or other vehicle part, thereby enabling estimation of engine conditions, and also enabling estimation of current engaged gear, whether by predetermined threshold limits according to a training data set, or algorithmic 'learning' of which gears are likely to be in use according to historical and current data. Such a device may be powered by a cell, or a solar panel, perhaps in conjunction with a super-capacitor or a combination of all of these (e.g. as a backup).

This embodiment of an improved monitoring device therefore provides a relatively inexpensive and flexible device that provides many of the benefits of existing telematics, black box devices in which the above limitations have been ameliorated or overcome.

According to one aspect the invention provides monitoring apparatus for providing vehicle telematics data, the apparatus comprising: means for sensing vehicle and engine motion induced vibration in part of a vehicle and for generating vibration associated data, the sensing means being adapted to be coupled to said part of said vehicle; means for processing said vehicle and engine motion induced vibration associated data to generate processed data representing at least one characteristic of said vehicle or engine; and means for communicating said processed data representing at least one characteristic of said vehicle or engine to a communication device for use in compiling telematics data for said vehicle.

According to one particularly beneficial aspect of the invention there is provided monitoring apparatus for providing vehicle telematics data, the apparatus comprising: means for sensing vehicle and engine motion induced vibration in part of a vehicle and for generating vibration associated data, the sensing means being adapted to be coupled to said part of said vehicle; means for processing said vehicle and engine motion induced vibration associated data to generate processed data representing at least one characteristic of said vehicle or engine; and means for communicating said processed data representing at least one characteristic of said vehicle or engine to a communication device for use in compiling telematics data for said vehicle; wherein the apparatus, by virtue of having a weight of less than 100 g, is sufficiently lightweight to allow the sensing means to sense said vehicle and engine motion induced vibration in said part of said vehicle with sufficient sensitivity for the processing means to detect, from said vehicle and engine motion induced vibration, at least one event affecting said vehicle, and to allow the apparatus to survive a typical vehicle collision.

The apparatus may, by virtue of having a weight of less than 100 g, is sufficiently lightweight to allow sensing means to sense said vehicle induced vibration in said part of said vehicle with sufficient sensitivity for the processing means to detect, from said vehicle motion induced vibration, at least one event affecting said vehicle that occurs whilst the vehicle is stationary with the engine off.

The apparatus may comprise a power supply (for example a battery such as a coin cell battery or the like) and wherein the apparatus has a weight of less than 100 g including said power supply.

The apparatus may have a weight of less than 50 g (possibly including the battery).

The apparatus may have a weight of approximately 25 g (possibly including the battery).

In one embodiment, the processing means may be adapted to process the vibration associated data to provide processed data representing at least one characteristic of the vehicle or engine comprising at least one of engine revolutions per minute (RPM), wheel RPM and/or currently engaged gear.

In another embodiment, the processing means may be adapted to process the vibration associated data to provide processed data representing at least one characteristic of the vehicle or engine comprising at least one of idle frequency, stroke cycle, number of cylinders, vehicle speed, engine type and/or vehicle type.

The processing means may be adapted to process said vibration associated data to provide the processed data representing at least one characteristic of the vehicle or engine in a format that requires further processing, by at least one of the communication device and another device to derive the characteristic of the vehicle or engine communication device for use in compiling telematics data for the vehicle.

The processing means may be adapted to generate the processed data based on a frequency analysis of the vibration. The processing means may be adapted to detect at least one vehicle related event based on said vibration data.

The sensing means may be adapted to be coupled to (to sense vehicle and engine motion induced vibration in) and to generate vibration associated data for, a part of the vehicle comprising at least one of a windscreen (windshield), a body part, and/or a part of a vehicle chassis.

The sensing means may be adapted for coupling to a rigid part of the vehicle. The apparatus may comprise a housing in which the sensing means may be located, the housing being adapted to be mounted to the part of the vehicle. The sensing means may comprise an accelerometer. Furthermore, the sensing means may be adapted to sense vehicle motion in a plurality of different dimensions and to provide associated motion data for the plurality of different dimensions.

In one embodiment, the processing means may be adapted to derive an orientation of the motion data to a longitudinal axis representing vehicle motion in a forward/reverse direction and a lateral axis representing vehicle motion in a lateral (left/right) direction when, in use, the vehicle begins to move after being stationary.

The processing means may be adapted to maintain the orientation of the motion data to the longitudinal and lateral axes for at least some future occasions when, in use, the vehicle begins to move after being stationary. The processing means may be adapted to derive an orientation of the motion data to a vertical axis based on a gravitational force.

The monitoring apparatus may comprise a connector for connecting the apparatus to a diagnostics port on the vehicle.

In one embodiment, the communicating means may be adapted to communicate using wireless communication. The communicating means may be adapted to communicate with the communication device using wireless communication in accordance with at least one of a: Bluetooth, Bluetooth Smart, Near Field Communication (NFC), Wi-Fi, 3G/2G, LTE, and Zigbee communication protocol. The communicating means may be adapted to communicate with the communication device using wired communication.

The monitoring apparatus may be adapted to receive power from an internal battery (e.g. a coin cell, cylindrical cell, or the like). The monitoring apparatus may be adapted to be connected into an electrical circuit of the vehicle and to receive power from the electrical circuit.

In one embodiment, the sensing means may be adapted to sense other vehicle motion and to output associated data; and the processing means may be adapted to process other vehicle motion associated data and to generate processed data representing at least one characteristic of the vehicle. The processing means may be adapted to process the other vehicle motion associated data to provide processed data representing at least one event affecting the vehicle, the event comprising at least one of: an acceleration event, an impact event whilst the vehicle is stationary and the engine is off, a motion event whilst the vehicle is stationary and the engine is on, a door opening or closing event, and an impact whilst moving event (e.g. a crash event, or a windscreen chip or crack event); and wherein said the communicating means is adapted to communicate the processed data representing at least one event affecting the vehicle to a communication device for use in compiling telematics data for the vehicle.

In yet another aspect, the invention provides a monitoring apparatus for providing vehicle data, the apparatus comprising: means for sensing vehicle motion and for generating vehicle motion associated data for a vehicle having an engine; means for processing said vehicle motion associated data to generate processed data representing at least one impact event affecting said vehicle whilst the vehicle is stationary with the engine off; and means for communicating said processed data representing at least one impact event to a communication device.

It will be appreciated that in this aspect the apparatus may or may not monitor other vehicle related data including other vehicle related telematics data. The term 'telematics' in this context is used inclusively to include the monitoring of any vehicle related data representing events affecting the vehicle including events while the vehicle does not have its engine on.

The means for communicating may be configured to communicate with an application on a user's communication device such as a mobile telephone or may be configured to communicate with a third party application (e.g. at an insurer's premises). The latter option may be used to allow the device to be interrogated by an insurer after an event. This beneficially allows a user to remove the device and send it to the insurer or other third party (e.g. police) for analysis when there is evidence of damage to the vehicle monitored by the device.

In yet another aspect, the invention provides a monitoring apparatus for providing vehicle telematics data, the apparatus comprising: means for sensing vehicle motion and for generating vehicle motion associated data for a vehicle; means for processing said vehicle motion associated data to generate processed data representing at least one impact event affecting said vehicle; and means for communicating said processed data representing at least one impact event to a communication device; wherein said apparatus is adapted to survive a vehicle collision by virtue of its weight being less than 100 grams.

In yet another aspect, the invention provides a monitoring apparatus for providing vehicle telematics data, the apparatus comprising: means for sensing vehicle motion and for generating vehicle motion associated data for a vehicle, the sensing means being adapted to be coupled to a part of said vehicle; means for processing said vehicle motion associated data to generate processed data representing at least one impact event affecting said part of said vehicle to which said sensing means is coupled, said impact event being indicative of damage to said part of said vehicle to which said sensing means is coupled; and means for communicating said processed data representing at least one impact event to a communication device.

In one embodiment, said part of said vehicle to which said sensing means is coupled may comprise glass (e.g. a windscreen or windshield of said vehicle).

In yet another aspect, the invention provides monitoring apparatus for providing vehicle telematics data, the apparatus comprising: means for sensing vehicle motion and for generating vehicle motion associated data for a vehicle, the sensing means being adapted to be coupled to a glass part of said vehicle; means for processing said vehicle motion associated data to generate processed data representing at least one impact event affecting said vehicle; and means for communicating said processed data representing at least one impact event to a communication device.

The processing means may be adapted to process said motion associated data to provide said processed data representing at least one impact event in a format that requires further processing, by at least one of said communication device and another device, to identify the occurrence of said impact event.

The apparatus may have a first data acquisition mode and a second data acquisition mode, the power consumption of the device being relatively higher in the second data acquisition mode than the first data acquisition mode; and said processing means may be configured to: identify at least one vehicle related event from said vehicle and engine motion induced vibration associated data; to determine a respective vehicle related event type for each identified event; to determine whether a change from one of the first and second data acquisition modes to the other of said first and second data acquisition modes should be triggered based on said determination of a respective event type for each identified event; and/or to trigger said change from said one of the first and second data acquisition modes to the other of said first and second data acquisition modes when it is determined that said change should be triggered.

In yet another aspect, the invention provides monitoring apparatus comprising: means for sensing vehicle and engine motion induced vibration in part of a vehicle and for generating vibration associated data, the sensing means being adapted to be coupled to said part of said vehicle; means for processing said vehicle and engine motion induced vibration associated data to generate processed data representing at least one characteristic of said vehicle or engine; and means for communicating said processed data representing at least one characteristic of said vehicle or engine to a communication device for use in compiling telematics data for said vehicle; wherein the apparatus has a first data acquisition mode and a second data acquisition mode, the power consumption of the device being relatively higher in the second data acquisition mode than the first data acquisition mode; wherein said processing means is configured to: identify at least one vehicle related event from said vehicle and engine motion induced vibration associated data; to determine a respective vehicle related event type for each identified event; to determine whether a change from one of the first and second data acquisition modes to the other of said first and second data acquisition modes should be triggered based on said determination of a respective event type for each identified event; and to trigger said change from said one of the first and second data acquisition modes to the other of said first and second data acquisition modes when it is determined that said change should be triggered.

In the second data acquisition mode, the apparatus may be configured to do at least one of: read sensor data at an increased rate relative to the first data acquisition mode in order to gather sensor data; send a communication signal at an increased rate relative to the first data acquisition mode for establishing a connection for transmitting data; select a different power-management algorithm relative to the first data acquisition mode; and/or choose an alternative service flow/communication protocol method relative to the first data acquisition mode.

The processor may be configured to: generate a profile of data from the sensing means; wherein said triggering of a change from said one of the first and second data acquisition modes to the other of said first and second data acquisition modes may comprise triggering a power management component configured to vary a duty cycle in dependence upon said profile between said one of the first and second data acquisition modes and the other of said first and second data acquisition modes.

In yet another aspect, the invention provides a method of monitoring vehicle a method of monitoring vehicle telematics data using the monitoring apparatus of any other aspect the method comprising: sensing, at the sensing means of the monitoring apparatus, vehicle and engine motion induced vibration in part of a vehicle to which the sensor is coupled and generating vibration associated data; processing, at the processing means of the monitoring apparatus, said vehicle and engine motion induced vibration associated data to generate processed data representing at least one characteristic of said vehicle or engine; and communicating, using the communicating means of the monitoring apparatus, said processed data representing at least one characteristic of said vehicle or engine to a communication device for use in compiling telematics data for said vehicle.

In yet another aspect, the invention provides a method of monitoring vehicle data, the method comprising: sensing vehicle motion and generating vehicle motion associated data for a vehicle having an engine; processing said vehicle motion associated data to generate processed data representing at least one impact event affecting said vehicle whilst the vehicle is stationary with the engine off; and communicating said processed data representing at least one impact event to a communication device.

In yet another aspect, the invention provides a method of monitoring vehicle telematics data, the method being performed by monitoring apparatus adapted to survive a vehicle collision by virtue of its weight being less than 100 grams, the method comprising: sensing vehicle motion and generating vehicle motion associated data for a vehicle; processing said vehicle motion associated data to generate processed data representing at least one impact event affecting said vehicle; and communicating said processed data representing at least one impact event to a communication device.

In yet another aspect, the invention provides a method of monitoring vehicle telematics data, the method comprising: sensing, at a sensor coupled to a part of a vehicle, vehicle motion and generating vehicle motion associated data for said vehicle; processing said vehicle motion associated data to generate processed data representing at least one impact event affecting said part of said vehicle to which said sensing means is coupled; and communicating said processed data representing at least one impact event to a communication device.

In yet another aspect, the invention provides a method of monitoring vehicle telematics data, the method comprising: sensing, at a sensor coupled to a glass part of a vehicle, vehicle motion and generating vehicle motion associated data for said vehicle; processing said vehicle motion associated data to generate processed data representing at least one impact event affecting said vehicle; and communicating said processed data representing at least one impact event to a communication device.

In another aspect, the invention provides monitoring apparatus for providing vehicle telematics data is provided, the apparatus comprising a sensor for sensing vehicle and engine motion induced vibration in part of a vehicle and for generating vibration associated data, the sensor being adapted to be coupled to said part of said vehicle, a processor for processing said vehicle and engine motion induced vibration associated data to generate processed data representing at least one characteristic of said vehicle or engine; and a communicator for communicating said processed data representing at least one characteristic of said vehicle or engine to a communication device for use in compiling telematics data for said vehicle.

In another aspect, the invention provides a monitoring apparatus for providing vehicle telematics data, the apparatus comprising a sensor for sensing vehicle motion and for generating vehicle motion associated data for a vehicle having an engine; a processor for processing said vehicle motion associated data to generate processed data representing at least one impact event affecting said vehicle whilst the vehicle is stationary with the engine off; and a communicator for communicating said processed data representing at least one impact event to a communication device.

In yet another aspect, the invention provides a monitoring apparatus for providing vehicle telematics data, the apparatus comprising: a sensor for sensing vehicle motion and for generating vehicle motion associated data for a vehicle; a processor for processing said vehicle motion associated data to generate processed data representing at least one impact event affecting said vehicle; and a communicator for communicating said processed data representing at least one impact event to a communication device; wherein said apparatus is adapted to survive a vehicle collision by virtue of its weight being less than 100 grams.

In yet another aspect, the invention provides monitoring apparatus for providing vehicle telematics data, the apparatus comprising: a sensor for sensing vehicle motion and for generating vehicle motion associated data for a vehicle, the sensor being adapted to be coupled to a part of said vehicle; a processor for processing said vehicle motion associated data to generate processed data representing at least one impact event affecting said part of said vehicle to which said sensor is coupled, said impact event being indicative of damage to said part of said vehicle to which said sensor is coupled; and a communicator for communicating said processed data representing at least one impact event to a communication device.

Also described herein is a beneficial method of managing data from the motion sensor the method comprising: obtaining, from the at least one sensor of the monitoring device, sensor data representing events affecting a monitored vehicle; processing said sensor data to identify said events, to determine a respective event type for each identified event, and to determine a respective background circumstance associated with each said event from a plurality of background circumstances of a common background circumstance type; outputting, to a user, in a first output stream, a respective representation of each identified event; and outputting, responsive to input from said user, in a different respective output stream for each background circumstance of said common background circumstance type, a respective representation of each said event with which said background circumstance is associated.

The processing may comprise processing said sensor data to determine a respective further background circumstance associated with each said event from a plurality of further background circumstances of a further common background circumstance type. The method may further comprise outputting, responsive to further input from said user, in a different respective output stream for each background circumstance of said further common background circumstance type, a respective representation of each said event with which said background circumstance is associated.

The background circumstance type may comprise at least one of the following: a first type in which each background circumstance represents an activity in which said monitored object is involved; a second type in which each background circumstance represents a behavioural circumstance related to the monitored object (e.g. individual or group of individuals responsible for the monitored object) at a time when the associated event occurred; and a third type in which each background circumstance represents a context in which an associated event takes place.

The background circumstance type may comprise a third type in which each background circumstance represents a context in which an associated event has taken place. The context may represent at least one of an environmental context (e.g. a temperature range or humidity range in which an associated event has taken place); a time context (e.g. a time of day in which an associated event has taken place); and a location context (e.g. a geographical location or region in which an associated event has taken place). Each background circumstance representing a context in which an associated event has taken place may represent any other context (which may be unrelated to environment, time of the event or the location of the event) such as, for example, historical context which depends on what has happened to the monitored object prior to said event, or any other appropriate context.

The processing may further comprise processing said sensor data to group events into a plurality of groups each event group comprising events of one or more different event types. The respective representation, of each event of a particular group, may share at least one common feature with each other representation of the events of that particular group.

The obtaining, may obtain said sensor data representing events affecting a monitored object together with time data identifying a time associated with said event.

The obtaining may obtain said sensor data representing events affecting a monitored object together with location data (e.g. satellite positioning data) identifying a geographic location or region associated with said event.

The obtaining may obtain said sensor data representing events affecting a monitored object together with environmental data (e.g. temperature and/or humidity data) identifying an environmental factor (e.g. a temperature and/or humidity) associated with said event.

Each identified event may be included in said first output stream in a chronological order. Each identified event may be included in each said output stream in a chronological order.

Each said output stream may be output as a different respective visual stream on a display.

Also described herein is apparatus for managing data from the motion sensor beneficially, the apparatus comprising: means for obtaining, from the at least one sensor of the monitoring device, sensor data representing events affecting a monitored vehicle; means for processing said sensor data to identify said events, to determine a respective event type for each identified event, and to determine a respective background circumstance associated with each said event from a plurality of background circumstances of a common background circumstance type; and means for outputting, to a user, in a first output stream, a respective representation of each identified event and for outputting, responsive to input from said user, in a different respective output stream for each background circumstance of said common background circumstance type, a respective representation of each said event with which said background circumstance is associated.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

The monitoring device preferably uses short range wireless radio technology such as Bluetooth, and is provided with a clock. The communication apparatus may be arranged to operate with a wireless communication technology having a relatively low unimpeded indoor range of up to approximately 50 meters (e.g. between ~40 meters and ~60 meters), operating in a frequency band of ~2.4 to 2.5 GHz, and/or having a bit rate of approximately 200 kbit/s (e.g. between 180 kbit/s and 220 kbit/s). The communication apparatus may be arranged to operate with a wireless communication technology having a lower bit rate than conventional Bluetooth. The communication apparatus may be arranged, for example, to operate with a wireless communication technology complying with Bluetooth low energy protocol, in order to save power. Thus a communication 'advertising event' can have a pre-configured low periodicity.

The invention may also provide a system including the monitoring device, a portable smart device configured for communication with the device, and a remote server configured to communicate with the smart device to obtain the data.

The server may, for example, be configured to include features such as digital key management for data confidentiality, authentication of devices and users, and anti-counterfeiting measures. It may also include an analytics engine for processing data. It may also include user interfaces for administration or consultation of data or events. It may also include an alerting mechanism for distributing data, events, or web links to data or events via SMS, email or other messaging systems.

BRIEF DESCRIPTION OF THE SEVERAL VIEWS OF THE DRAWINGS

In order that the invention may be more readily understood, reference will now be made by way of example to the accompanying drawings, in which:

FIG. 5b is an example line plot associated with FIG. 5a;

FIG. 6b is an example line plot associated with FIG. 6a;

FIG. 7b is an example line plot associated with FIG. 7a;

FIG. 9 is a diagram of an example journey fingerprint for a vehicle that is using the monitoring device of the system of FIG. 1;

FIG. 12 illustrates a generalised technique for managing complex data from a sensor of a monitoring device similar to the more specific example of a journey fingerprint shown in FIGS. 9 and 10.

DETAILED DESCRIPTION OF THE INVENTION

The embodiments described with reference to the figures are illustrated, primarily, by reference to their application in the insurance industry. It will be appreciated, however, that the concepts disclosed are equally applicable in other industries and in particular to the owners and managers of fleets of vehicles such as vehicle hire companies, companies providing company cars to employees, haulage companies, delivery companies etc.

Figure 1:
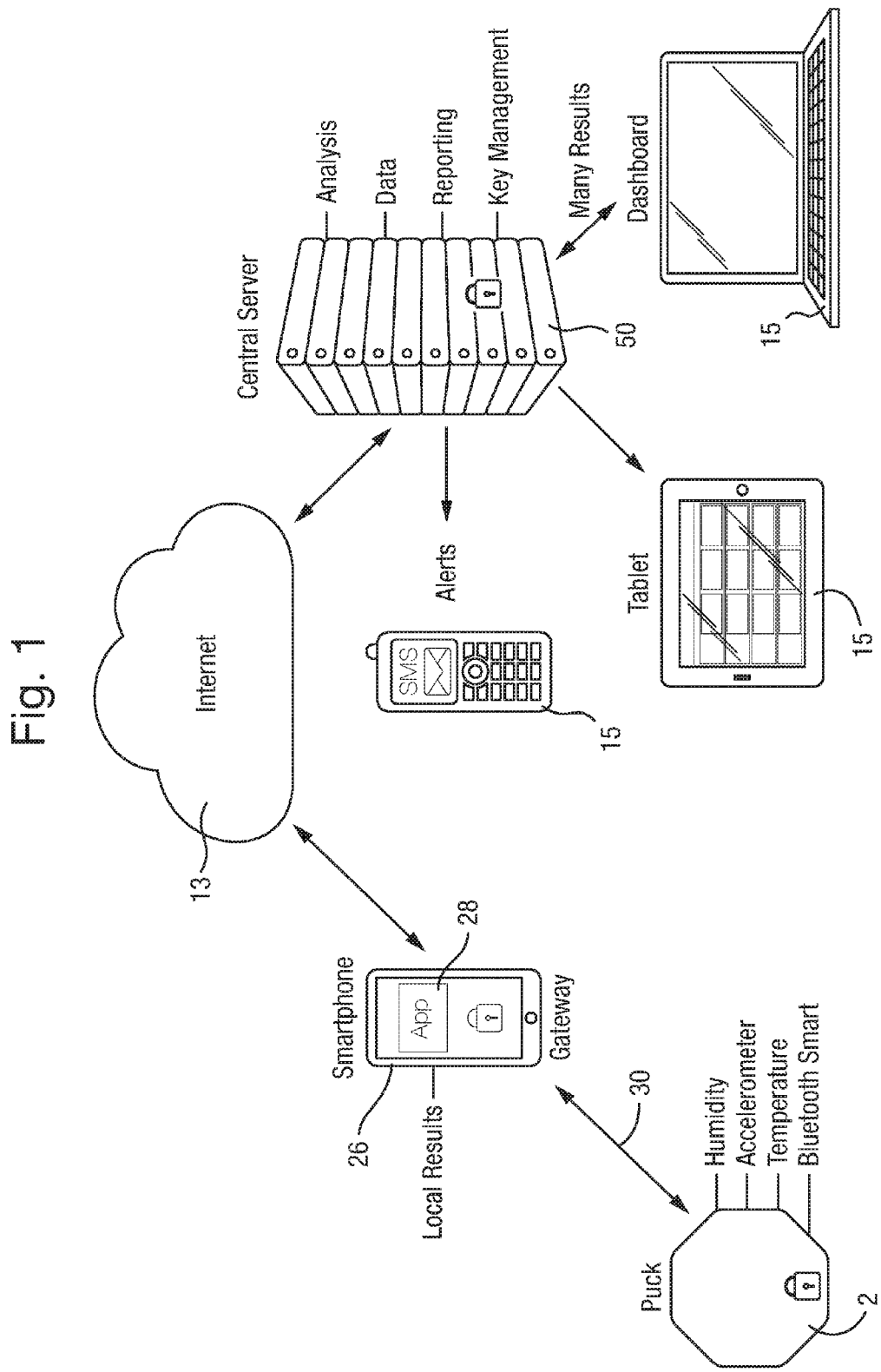
FIG. 1 is an overview of a telematics monitoring system.

Referring to FIG. 1, the invention provides a system 1 for use in Insurance Telematics comprising a monitoring device or 'tag' 2, a 'smart' user communication device 26 comprising a smart device application ('app') 28 for communication with the monitoring device 2, and a secure remote server 50 for handling analysis, reporting and alerting configured to communicate with the smart device 26 via app 28 and a communication network 13 such as the internet. The server is also able to communicate with a number of other devices 15 such as, for example: a mobile (cell) phone (e.g. using a short messaging service SMS or automated voice call), a tablet computer (e.g. via an associated web page or app) and/or a personal computer (e.g. via an associated web page or dedicated software on the personal). In the above exemplary system, the monitoring device 2 is configured to monitor vehicle usage data and to wirelessly transmit this data to the app 28 installed on the smart user communication device 26. The smart user communication device 26, in this example comprises a 'smart-phone' that is configured to transmit the received vehicle usage data received via app 28 over the internet 13 to the secure remote server 50.

The secure remote server may belong to an insurance company or an owner of a fleet of cars for example. System 1 would allow the insurance company to track the driving behaviour of a driver and establish a 'risk' profile based on the driving behaviour for that driver, for insurance purposes. The driving behaviour being recorded may also be used to provide feedback to the driver as to how well they are driving or to capture the details of an accident or collision. Use of such a system is advantageous to a driver as good driving behaviour may facilitate them to save on their insurance premium.

In this embodiment, the monitoring device 2 is rigidly mountable to a vehicle windscreen or windshield (or other part of the vehicle such as the door sill, chassis cross-brace or the steering wheel) and comprises a sensor array for measuring the vibration and acceleration of the vehicle to which it is mounted. Typically, the sensors used may include accelerometers as well as temperature and humidity sensors, but they may include other sensors such as light, magnetometer and gyroscopic motion. The monitoring device 2 being rigidly mounted onto the vehicle windscreen/windshield is particularly advantageous as it allows even the relatively small vibrations associated with subtle changes in engine activity, which may otherwise be inadvertently filtered out, to be detected by the monitoring device 2. The detected vibrations and/or other information from the accelerometer can then be used to infer multiple aspects of vehicle usage data and driving behaviour of a driver. These aspects may include wheel speed, engine RPM, gear selected, longitudinal and lateral acceleration, ABS/ESP events, impact or crash severity and orientation of a vehicle. In addition to capturing these subtle vibrations, the rigid mounting of the monitoring device 2 also allows for the detection and logging of bumps and scrapes effected onto the vehicle when it is not in use (for example whilst parked). The monitoring device 2 is also sufficiently small and lightweight enough to allow the sensors to sense these very subtle vehicle vibrations. Furthermore, the monitoring device 2 is arranged to use short range radio technology such as Bluetooth.

Typically the smart-phone 26 can operate with a wireless communication technology having a relatively low unimpeded indoor range of up to approximately 50 meters (e.g. between ~40 meters and ~60 meters), operating in a frequency band of ~2.4 to 2.5 GHz, and/or having a bit rate of approximately 200 kbit/s (e.g. between 180 kbit/s and 220 kbit/s). The smart-phone 26 can also operate with a wireless communication technology having a lower bit rate than conventional Bluetooth, for example, to operate with a wireless communication technology complying with Bluetooth Low Energy (BLE) or Bluetooth Smart protocol, in order to save power. Furthermore, smart-phone 26 typically can make use of GPS.

The app 28 will typically be installed by the user on the smart-phone 26 although it may come pre-installed on the smart-phone 26.

The app 28 comprises a 'scan' mode in which it causes the smart-phone to scan for nearby monitoring devices and to provide a list of the permissible devices seen by the user. The user can then select the appropriate monitoring device 2 from the list using the app 28 and assign the correct monitoring device 2 to the correct vehicle. The app 28 may, as part of this process, monitor the signal strength of the nearby monitoring devices and suggest the monitoring device 2 which is nearest (i.e. has the strongest signal) to the user (e.g. by prioritizing the list, highlighting the closest device(s), or simply presenting one device to the user). This process also includes a rejection function, if the device 2 has not been associated correctly via the app 28. Additionally, the device 2 is able to reject communication requests from an unassociated app from another user. The association between the smart-phone 26 and monitoring device 2 need only happen relatively infrequently (e.g. once a year at renewal).

Beneficially, in this example, the monitoring device also has a mode for providing an indication to the user to confirm that the app 28 is indeed communicating with the monitoring device 2 that the user believes it to be. This is particularly useful for situations where a new or previously un-paired monitoring device 2 is to be utilised especially where there are a number of potential choices of device in the vicinity (e.g. multi-car insurance, where the owner is pairing all of their vehicles/tags at once). The indication, in this example, could be a visual indication (e.g. comprising a light emitting diode (LED)) which has a first flashing status (e.g. having a particular flash signature, flashing at a particular rate and/or a particular colour) when the monitoring device 2 is first activated (e.g. by having a battery tab removed) to indicate that the monitoring device 2 is ready to be associated ('aligned') with a vehicle. The indication then moves into a second flashing status different to the first (e.g. a different flash signature, flash rate and/or colour), when being interrogated by a user's app, to confirm that it is this monitoring device 2 that the user is now interrogating via app 28.

It will be appreciated, by those skilled in the art, that any suitable visual, audio or other indicator (or combination thereof) may be used to provide a similar confirmation process.

Once the app 28 and the monitoring device 2 are communicating the app 28 requests that the user confirms that the monitoring device 2 is attached to the vehicle that is associated with the user in the app 28 or requests that the user identify the vehicle to which the monitoring device 2 is attached either by selecting from a list of vehicles provided on a selection page in the app 28 (if multiple vehicles are associated with the user in the app 28) or manually if the app 28 does not currently have the details of the vehicle (e.g. because the insurer has not yet formed the association at the central server). This is particularly advantageous in situations where a user has insured multiple cars at the same time.

Once the app 28 has completed linking the monitoring device 2 to the correct vehicle, no further user setup is required and the monitoring device 2 is able to auto-configure its own internal algorithms. The app 28 provides a mode which can be consulted by the user in order to ascertain whether the monitoring device 2 is 'live'. The monitoring device 2 remains in an 'on' state until such a time as its power source runs out. In order to save energy, the monitoring device 2 may provide no visible signs of the 'on' state.

The app 28 is configured to run in the background on the smart-phone 26. This is advantageous as there is no need to actively start the app 28 prior to driving. The app 28 is configured to interrogate the monitoring device 2 without any need for user interaction with the app 28. The app 28 is configured to communicate with the secure remote server 50 where it is agreed it can do so. This will typically be in areas of free Wi-Fi, or when cellular data is low cost or free. The app 28 comprises settings including permission settings which can be used by the user to configure the app 28 in order to define where and when the app is allowed to run and to communicate with the secure remote server 50. For example, a particular permission may need to be set by the user to allow the app 28 to run in the back ground. Another example would be where the user defines the settings of the app 28 in such a way to allow the app 28 to upload its data to the secure remote server 50 once a week.

User interaction with the monitoring device 2 is via app 28. The app 28 is configured to allow the user to carry out tasks such as reviewing journeys and seeing where, for example, high risk maneuvers minimised their savings potential.

Even if the user elects not to give the app 28 sufficient permissions to work in the background, the monitoring device 2 is always on, and hence will always log key aspects of every journey that the vehicle takes. The app 28 is configured to make use of the GPS component available in the smart-phone 26 by making occasional requests for a GPS location plot from smart-phone 26. The monitoring device 2 manages the regularity of these requests based on various factors such as its knowledge of the journey and what it expects to see in terms of vehicle signature (largely the engine signals seen), driver signature (typical driver behaviour) and road signature (key bumps in the road). The monitoring device can minimise its reliance on GPS data by only requesting data to supplement what it already knows. For example, based on its acceleration data the monitoring device 2 may request a speed and location confirmation to supplement its risk alert prediction. This is advantageous as the user is provided with a system that needs only minimal GPS requests, enabling prolonged battery life of the user's smart-phone 26.

Since it is possible for the user to inhibit the app 28 from running in the background throughout a particular journey, it is possible to lack GPS data for those journeys. Through its connection 30 to the app 28 the monitoring device is aware that the vehicle is being driven without the app 28. Such information is highlighted in the risk profile of the user and may result in the user losing their access to savings with alerts being sent to the insurer that the user is repeatedly electing to evade the system functionality. This alerting could be performed by other means if the primary driver insists on keeping their phone/App switched off, e.g. by using the Apps on other users/drivers phones, or by reminding the primary driver via email or text etc. that without access to the usage data, either premium reductions aren't possible, or in extreme cases, perhaps the insurance policy is null and void.

The app 28 is configured to show multiple views of the usage data gathered from the monitoring device 2. The usage data can be expanded based on activity, owner and context. For example, the monitoring device 2 can establish and indicate who was driving during which journey and hence who was responsible for causing each alert. This data can be viewed at a year view, all the way down to a particular journey with alerts highlighted. Each individual alert can then be analysed and an explanation given as to why, for example, a combination of high-risk driving, location, time, speed, acceleration, etc.

The secure remote server 50 is configured to receive the data collected by the app 28 at intervals either pre-set by the insurer or set by the user for collation, further analysis and coordinated response. The data comprises the monitoring device 2's logged data and some GPS data from the smart-phone 26 relating to location and vehicle speed. The app 28 is configured to perform some processing of the data prior to transmitting it to the secure remote server 50 over communication network 13. This is advantageous as it minimises the communication requirement to the analytics component of secure remote server 50. Once real risk alerts have been confirmed, these will be sent back down to the app 28 via the communication network 13 to highlight were savings have or could have been made. This information may include the reasoning behind such risk assessments and will typically be more involved than simply "driving too fast" or "high lateral G".

It will be appreciated that the above embodiment is only one example of how system 1 may be implemented. There are a number of alternatives and modifications which may be made to system 1 without diverting from the scope of the claims. A number of alternatives and modifications are listed under the section 'Modifications and alternatives' described at the end of this document.

In the context of Insurance Telematics, there are quite a number of advantages to be gained by an insurer choosing to use system 1 and its customers. Due to the smallness, lightweight-ness and thinness of the monitoring device 2, it can easily be posted out to customers when the insurer sends out their annual renewal documentation in the normal postal system. The insurance company can request that the driver install the monitoring device 2 and to install the latest version of app 28 allowing the insurer to receive a notification via app 28 that the customer has successfully installed the monitoring device 2 onto their vehicle. There are substantially zero installation costs incurred by both parties (i.e. the insurer and the driver) and given the monitoring device 2 is very low-cost it can be treated as a disposable device which ties in well with the annual cycle of insurance and the usual habit of swapping between insurers to get a lower quote. All of this helps lower premiums. Monitoring device 2 requires no power or electrical connection to the vehicle, no special fitment to be attached to the car and therefore no agreed relationship with the vehicle Original Equipment Manufacturers (OEMs). The monitoring device 2 (including app 28) provides a complete service and not just a sensor. For example, it is possible to provide the owner or driver of a vehicle with accurate impact logs which could provide evidence to mitigate personal injury claims, and provide a certain impact/accident alert, even if the accident was small. The monitoring device in effect provides a pro-active crash event notification service, where, immediately after an accident, the critical crash data can be shared with, and analysed by, the backend systems, such that an insurance company could feasibly try to contact the driver in question to reassure them that incident was detected, and actions are already in motion with regards to the claim process. Such a solution provides some clear enhancements over smartphone-only solutions that can only rely on GPS data, e.g. knowing the exact collision data can shed some light on who was to blame (e.g. the device detects a rear shunt, not the fault of the insured driver) or whether or not the driver should seek medical advice (e.g. if the impact was of sufficient severity and type to potentially cause a whiplash injury)

Benefits to the customers include lower premiums with the usual costs associated with a black-box and its installation avoided. Because of the quality of the data recorded, detailed analytics can be shared with the driver to explain how their risk profile can be further enhanced or improved. Since the monitoring device 2 is able to assess who is driving the vehicle, even if the same smart-phone 26 is always used, it would be possible to preserve a multi driver fingerprint. As the monitoring device 2 is always 'on', it can highlight when the vehicle has seen an impact, even if the driver is not in their vehicle and the vehicle is parked. Furthermore, the monitoring device 2 is able to accurately detect severe crashes and can use the smart-phone 26 to alert, for example, the insurance company, and perhaps even the emergency services or other road users.

The various components of the system 1 are now described in more detail in the following sections.

Monitoring Device

Figure 2:
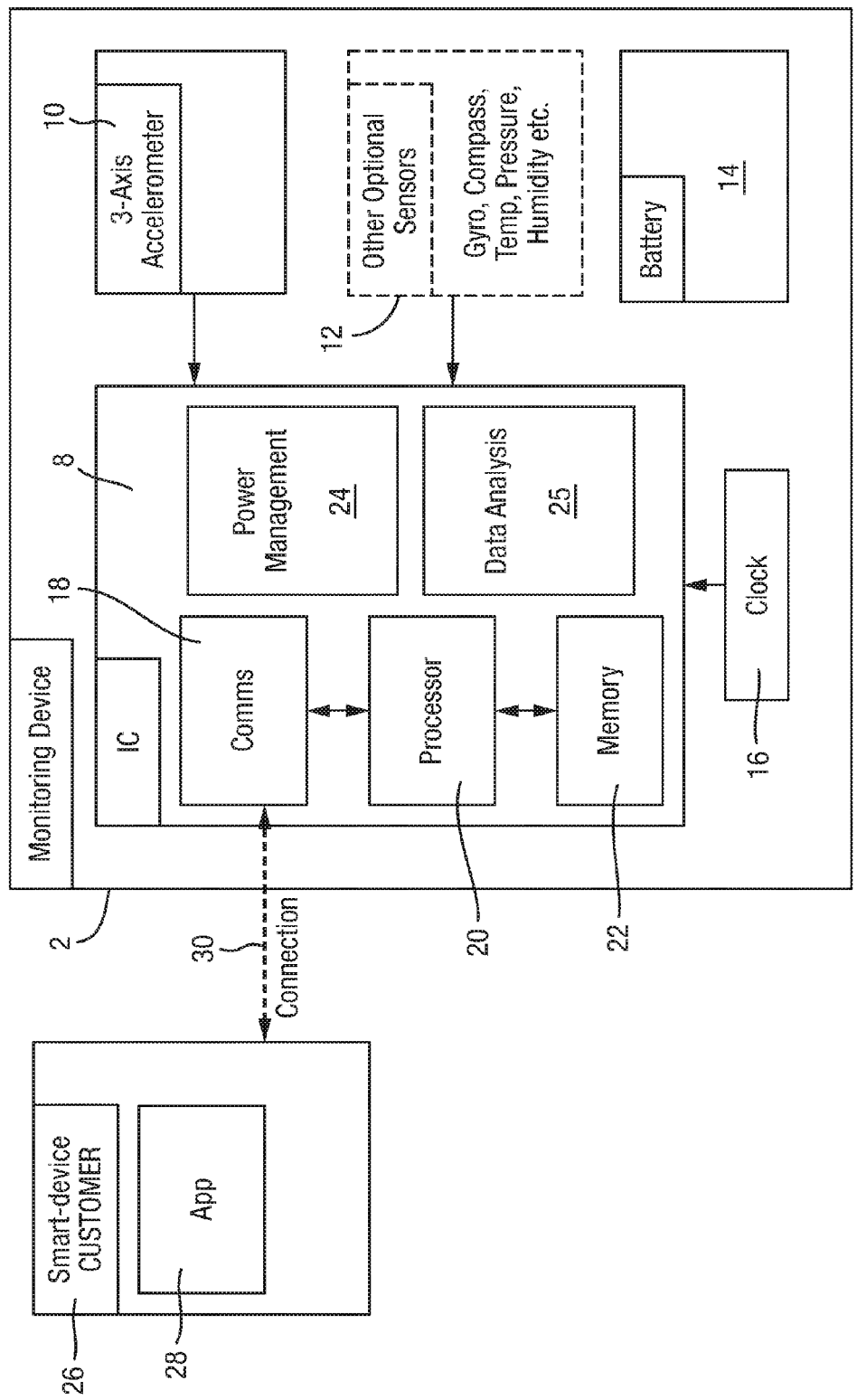
FIG. 2 is a simplified block schematic of a monitoring device for use in the system of FIG. 1.

FIG. 2 shows a simplified block schematic of a monitoring device.

The monitoring device 2 comprises a form factor providing a small package containing the device components, which are shown schematically in FIG. 2. The device 2 comprises a control module 8 which, in this embodiment, comprises an integrated circuit (IC) such as a Bluetooth Smart chip 8. The control module 8 is in communication with a 3-axis accelerometer 10. Power, in this example, is provided by a battery 14 such as a coin cell, and timing and synchronisation data is provided by a clock 16. Optionally one or more additional sensors 12 such as temperature, pressure or humidity sensors may be included that the control module 8 is in communication with to acquire additional sensor data. The device 2 may also include one or more security components (a secure IC or the like), for the purposes of verifying messages from other systems such a smart-phone or server, or confirming the authenticity of the device to other systems such as a smart-phone or server.

In general, the lighter the monitoring device is the better the monitoring device's sensitivity to subtle vibrations and the wider the range of vehicle characteristics that can be extracted from the data acquired by the monitoring device. More specifically, by minimising the device mass and hence inertia, it is possible to capture event signatures that would be missed by a heavier apparatus. Accordingly, the package, in this embodiment, is small enough and lightweight enough for the monitoring device to be fitted unobtrusively to the windscreen (or other part) of a vehicle without interfering with the ability of accelerometer 10 to sense the subtle vibration related data required to determine vehicle related data such as engine revolutions per minute accurately. Typically, for example, the package fits within an approximately 45 mm×45 mm×10 mm volume and has a particularly advantageous weight of ~25 g or less. The weight of the device, being less than ~100 g (including battery) (and even more advantageously less than ~50 g) is also particularly advantageous because it ensures that the device is easier to mount robustly, directly to a surface for which vibrations are to be measured, with a good coupling between the device and the surface (e.g. adhesive tape is sufficient rather than a more complex mounting arrangement that would negate the ability to extract vibration related date); because it makes it easier to post out to customers and to install in a vehicle without specialist assistance; and because it allows the device to survive most vehicle collisions without significant damage thereby allowing potentially vital impact event data to be obtained following (or possible even during) an accident. The low weight also allows extraction of other vehicle related data such as, for example, a large amount of diagnostics data including data relating to: suspension 'health'; tyre pressures; tyre alignment; exhaust 'health' and/or the like. It will be appreciated, however, that whilst a weight of less than 100 g has been found to yield particularly good vibration analysis and associated results, a monitoring device of less than ~150 g (or even less than ~200 g) could still be used to provide useful vibration related data. The control module 8 comprises a communication interface 18, coupled to a processor 20, which is coupled to a memory 22, a power management component 24, and a data analysis module 25. The communication interface 18 may use Bluetooth, Bluetooth Smart, NFC, Wi-Fi, 3G/2G, LTE, Zigbee or any other suitable wireless protocol. The interface 18 is configured to send an 'advertise' signal periodically which can be detected by a corresponding device of for example a driver's smart-phone 26 or other smart device, and is configured to establish a connection 30 with the smart-phone 26 for the transfer of data. Conveniently, the system of the invention also provides a smart-phone application (app) 28 which can be installed on the smart-phone 26 for use interrogating the monitoring device 2. As an example, Bluetooth Smart devices typically have a range of about 50 m indoors (if the transmit route is unimpeded).

The accelerometer 10 serves as an event sensor configured to trigger its interrupt command and to start storing pre-buffered data when events occur. For example, an event may be triggered at the onset of acceleration or deceleration exceeding one or more predetermined thresholds. The internal rolling buffer of the accelerometer is sufficient so that the onset of such events is captured, even in pre-trigger mode. This buffered data is then stored with the rest of the triggered data in a single log file per event.

For example, a 'significant' event may be triggered if the acceleration detected in one or more axis exceeds a predetermined threshold level, which is distinct from normal background levels, indicating that an abnormal event, such as an accident (e.g. heavy impact from the rear) or a bend being taken too fast, has occurred. Similarly, if deceleration exceeds a predetermined threshold level, which is distinct from normal background levels, it may indicate that an accident has occurred (e.g. an impact that sharply arrests movement of the vehicle) or a heavy braking event. Other less significant events, such as door opening and door closing events, engine idling events, high rev events, minor impacts whilst the vehicle is stationary and engine off (e.g. a bump in a car park), may also be detected and used to trigger data acquisition.

A higher fidelity 'log' mode may be activated when needed during which the data is sent to the control module 8, which reads the data at a higher rate during an event window, until the event is complete. This may be a predetermined time frame or may be determined in dependence upon the data. For example the control module 8 may collect the data at about 400 Hz for a few seconds or more, although it may block read the data faster than it collects it.

The device may be configured using a platform design approach such that additional sensors 12 can be added. A low power mode for any sensors or a sensor cluster may be implemented as a default outside of an event window. This can be done within a sub-system of the sensor(s) or may be controlled by a function of the power management component 24 coded on the control module 8. Thus aspects of the power management algorithm may be implemented on the control module 8, such as the smart sensing function described above, wherein power consumption is minimised when the sensor is in 'sleep' mode, and the communication low-power/low-frequency advertise mode also described above when it is inferred that the device is not near an interrogating smart device. When the device comes out of 'sleep' mode in response to an event, an event relevant power-management algorithm may be selected, and/or an appropriate service flow/communication protocol may be selected, in dependence on the nature of the detected event.

The data analysis module 25 comprises a firmware or software module designed to cause the processor 20 to analyse the data acquired from the accelerometer 10 and any other sensors. The processor 20, under the control of the data analysis module 25, performs preliminary analysis on any data acquired and determines what data should be stored, following this preliminary analysis, for storing in the memory 22 for subsequent transmission to the smart-phone 26.

Thus, the memory 22 stores the processed sensor data relating to detected events, ready for transmission to a smart-phone 26, such as to the smart-phone app 28. How data is stored may be dependent upon the nature of the event sensed. For example, for a significant event (one where a predetermined acceleration or deceleration is exceeded) sufficient data may be needed to provide useful information about the nature of the event and any attempted evasive action taken and to determine the severity of the event and/or further data that might allow for a more detailed analysis following receipt by the smart device and/or by the server. Other events, for example those that can be characterised as known regular events such as door opening or door closing event may require less data to be stored (e.g. time of event, type of event, and possibly a severity indicator).

Figure 3:
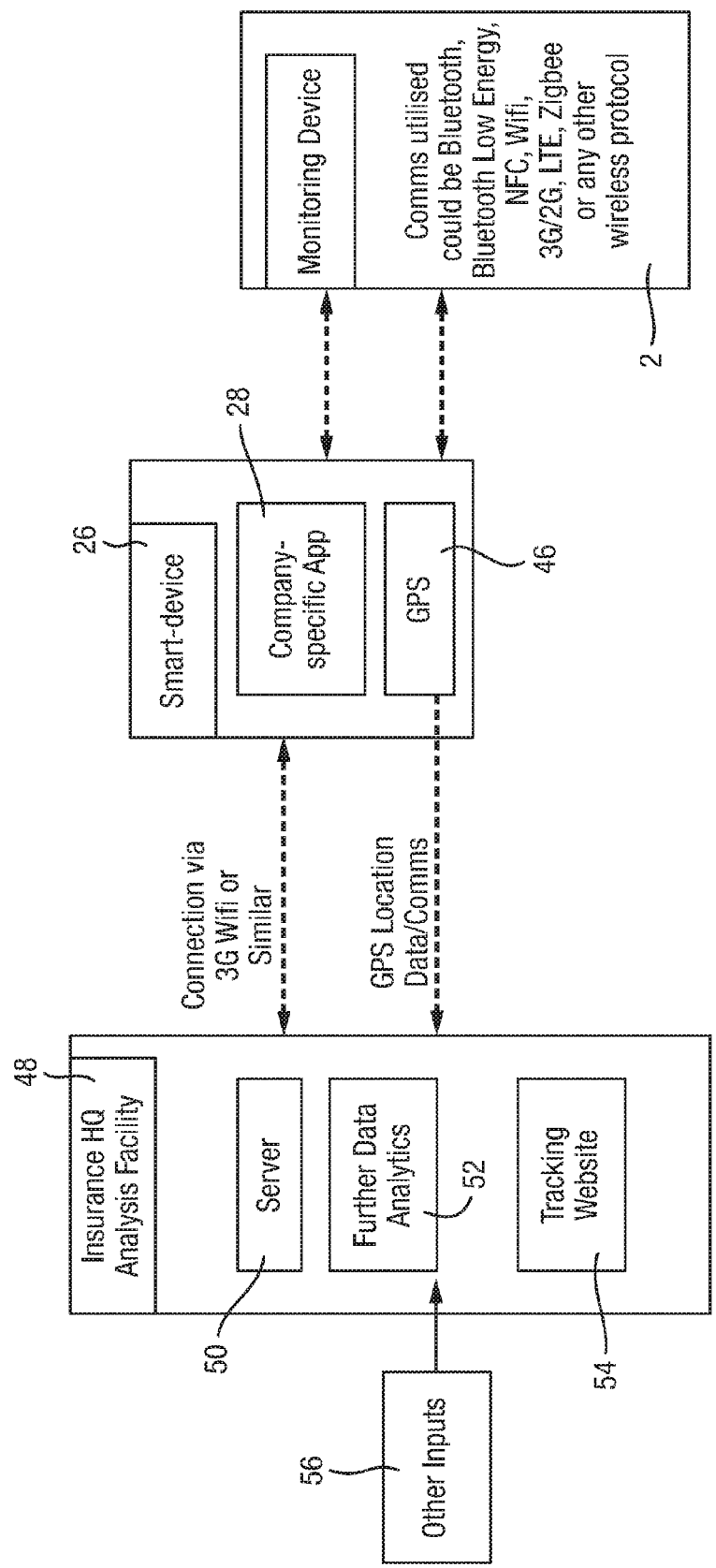
FIG. 3 is a simplified block schematic of the system of FIG. 1.

Referring to FIG. 3, as already discussed a customer interrogates the monitoring device 2 via an app 28 installed on a smart-phone 26.

In addition the system may include a analysis facility associated with a 'headquarters' 48 of a company having an interest in the driving behaviour of the customer, such as an insurance company or fleet owner. The analysis facility may provide a server 50 such as a cloud server, which could for example allow remote monitoring of data, as analysed at the server end, relating to the vehicle or driver through a smart-phone in possession of the vehicle owner (which may be the same as, or different to, the smart-phone used to collect and communicate the data from the monitoring device 2). The location of the vehicle may be derived from a GPS device 46 in, or associated with, the smart-phone 26 used to collect and communicate the data from the monitoring device 2. Alternatively the monitoring device 2 may provide access to an internal GPS device (although where the monitoring device 2 is powered by its own internal battery an external GPS would be advantageous to avoid excessive power consumption). The monitoring device 2 may thus be interrogated at any time by use of an insurance company-specific app 28 on the smart-phone 26.

The analysis facility 48 may be provided with further data processing equipment 52 for processing the data remotely. Such data processing can use more powerful algorithms since processing power and power consumption will not be limited as for a portable device. Furthermore other sources of data 56 may be used to supplement the data from the monitoring device 2 such as the previous claim or driving history of a user or the behaviour trends of particular risk profiles as relating to age, gender, vehicle type, etc.

Furthermore the company can react to sensed incidents pro-actively, for example sending a message or alert or call informing a customer of the time and nature of potential damage to their vehicle and providing them with details of their claim options, or the effects of making a claim on their premium, etc. This not only provides a clear service differentiator to the insurance company, but such is the accuracy of the crash data, that they can immediately ring-fence an associated cost for such a claim, thus greatly enhancing their own business risk model. In addition the facility may provide a website 54 for use by customers to track the location of their vehicles, and the occurrence of any significant incidents. This is particularly advantageous for vehicle owners whose vehicles are being used by other drivers (e.g. their high-risk teenage child or an employee).

Operation

Typical operation will now be described by way of example only, once a user has received the monitoring device from an insurance company.

The user first attaches the monitoring device 2 to the vehicle windscreen or windshield, the monitoring device 2 is then enabled by pulling out a battery tab or similar to physically switch on power to the monitoring device 2. The visual indication confirms that the monitoring device is now on and waiting for 'pairing' to the owners smartphone. The visual indicator may also be used to indicate other events, for example, that the monitoring device is now logging events or that the battery is low. However, having a visual indicator is not essential and by eliminating it or restricting its use, more battery power can be reserved for prolonged operation of the monitoring device 2. It should not be possible to turn off the device once connected to the vehicle and initialized.

The user then uses the app 28 to enter the 'scan' mode and to select an appropriate monitoring device 2. Communication is established between the monitoring device 2 and the smart-phone 26 and the monitoring device 2 confirms a successful 'pairing' either via the app 28, or perhaps by changing its visual indication to a second status to confirm that it is this monitoring device 2 that the user is now interrogating via app 28.

Once the app 28 and the monitoring device 2 are communicating the app 28 requests that the user confirms the details of the vehicle that the monitoring device 2 is attached to by confirming a vehicle highlighted by the app 28, by selecting a vehicle from a list of vehicles provided on a selection page in the app 28 (if multiple vehicles are associated with the user in the app 28) or manually if the app 28 does not currently have the details of the vehicle. The app 28 then associates the monitoring device 2 to the correct vehicle. As explained later, the device 2 can confirm the driver and vehicle type once it has logged actual usage data, which may help insurance companies compare insured vehicles/drivers with actual, as detected by device 2.

By attaching monitoring device 2 to the vehicle windscreen or windshield, and by setting the monitoring device up as described, measurement of the many subtle car vibrations can be logged and analysed.

Figure 8:
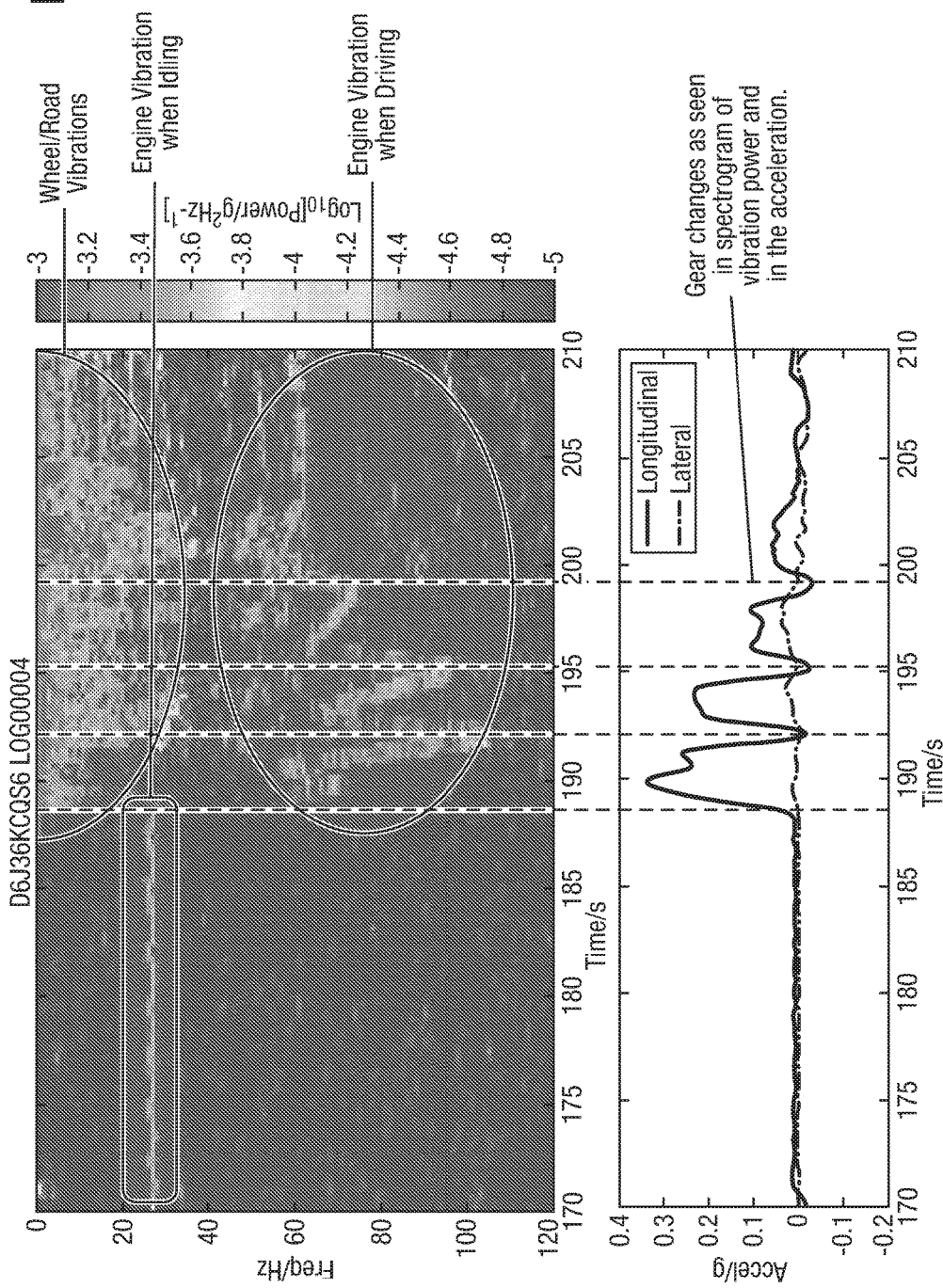
FIG. 8 is an example of a spectrogram of vibration power and acceleration of an example vehicle over time.

For example, FIG. 8 shows an extract of the orientated and smoothed (unwanted engine vibrations removed) accelerometer data and the spectrogram of vibrations for a supermini.

The extract illustrates some engine idling before the car pulls away (at just below 30 Hz frequency in the spectrogram) with a particularly aggressive progression through the gears (as seen at time points approximately at 189, 192, 195, and 199 seconds in the frequency range from approximately 60 Hz to approximately 100 Hz in the spectrogram). In this case the gear changes are clearly visible in both the oriented accelerometer data as a break in the acceleration and in the vibration data as discontinuity in the fundamental frequency of the engine RPM. The wheel rotation and road noise related vibrations are clearly distinguished from those related to engine rotation by frequency (having a frequency of below approximately 40 Hz) and can therefore be filtered out and/or analysed separately.

The sorts of vibrational analysis that is, and can be, typically performed will now be described in more detail by way of example only with reference to experimental data and possible applications of the analysis in the telematics field. The vibrations logged can be broadly split into wheel/road vibrations and engine vibrations. In ideal circumstances it is possible to determine the car speed from the wheel vibrations (given a known wheel diameter). The engine idle frequency can be clearly identified from the engine vibrations when the car is stationary and in most circumstances this enables the identification of the engine type (e.g. stroke cycle and number of cylinders) and the conversion of the fundamental frequency of engine vibrations into engine RPM. This enables the determination of gear changes. If the gear ratios are known (or can be approximated) the specific gear could also be determined—alternatively the gears can be 'counted' from standstill to determine approximate gear-in-use data.

Furthermore, variations between journeys with the same car and driver can be used to infer the type of journeys undertaken (for example, long periods on a motorway typically result in a concentration of low accelerations).

Correct Orientation

Advantageously, correct orientation of the monitoring device 2 sensor accelerometer axes with the longitudinal (forward/backward), lateral (left to right) and vertical axes of the vehicle, can be achieved in a two stage process without any external manual input from a user. The first step is to rotate the calculated data axes within the device 2 software such that gravity points down along vertical axis (or 'z' axis or 'axis three'). The forward/backward and side to side components are then separated by rotating the remaining two axes until the independence of the signals in the two axes is maximised (this is done using a mathematical technique called principal component analysis that maximises a statistical measure called the kurtosis).

The forward/backward and side to side components are then separated. The forward/backward or 'longitudinal' acceleration axis is identified from occasions when the vehicle pulls away from being stationary. There will always be an acceleration in the forwards/backwards direction first, even if the vehicle is pulling away around a corner, as lateral accelerations are proportional to the vehicle speed as well as the turn rate, and when pulling away the vehicle's speed is very low. Whilst a vehicle may reverse out of a parking space, and hence the forward direction of the axis may not be determined correctly immediately, in the majority of cases the vehicle will then move forward, and will also move forward when pulling away from junctions and traffic lights, so this can be robustly used to determine, and subsequently confirm (or correct) the forward/reverse direction of, the longitudinal axis. Hence, the orientation of the lateral acceleration axis can also be determined accurately.

Acceleration Correlation Plots

Advantageously, the analysis of data from the accelerometer can be used to provide data that can be used to assess driving performance against an idealized longitudinal acceleration and the lateral acceleration profiles.

Figure 4:
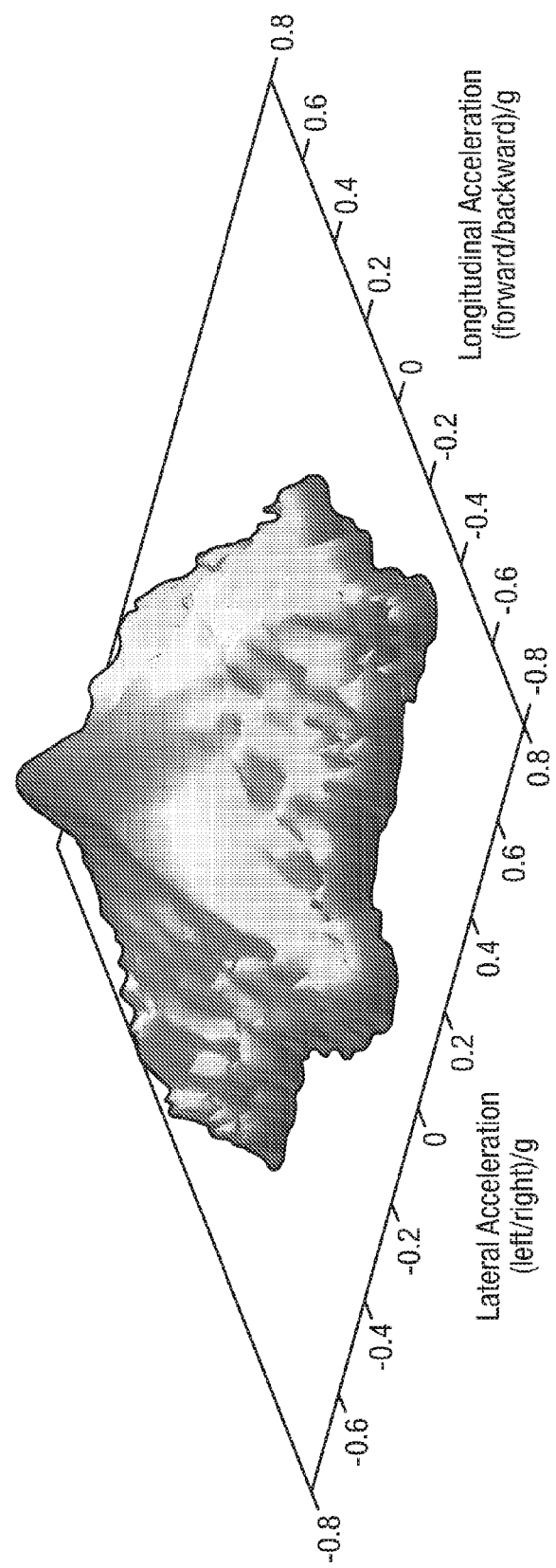
FIG. 4 is an example of an idealized plot of the correlation of the longitudinal acceleration and the lateral acceleration of an example vehicle.

An idealized plot of the correlation of the longitudinal acceleration and the lateral acceleration of the vehicle is shown in FIG. 4 which shows that the acceleration data is largely clustered around the x (longitudinal acceleration) and y (lateral acceleration) axes during normal driving with occasional excursions during more vigorous maneuvers. The clear peak at the origin of this plots shows that for the majority of the time no vehicle accelerations are seen, i.e. either the car is stationary or at a constant velocity and heading (e.g. on a motorway or other straight road). In normal driving, excursions along a single axis are to be expected, e.g. the driver is accelerating or braking in a straight line. In normal driving, most drivers tend not to steer and brake/accelerate at the same time, hence steering inputs are usually seen at a constant speed, therefore this plot shows steering-only excursions along the y-axis. Steering inputs tend to be less severe than accelerations that can be generated by accelerating or braking, hence the contour map shows a larger permissible excursion along the longitudinal access, with smaller permissible excursions along the lateral access.

Where drivers clearly and repeatedly differ from this plot profile, e.g. they often combine heavy braking deceleration with harsh steering input, it is clear that such activity can be assumed to be of a 'racier' driver. Whilst this knowledge does not directly correlate to risk (for example they may be a very capable driver driving a very capable car), it does enhance the accuracy of how such a driver can be assessed. What is perhaps more useful is that particular driving characteristics can be compared to known driving styles associated with age/gender etc., and decisions made on this comparison, e.g. the data may highlight many sporadic driving inputs, usually indicating an elderly driver, and the risk profile can therefore be optimised accordingly for that specific driver.

Figure 5A:
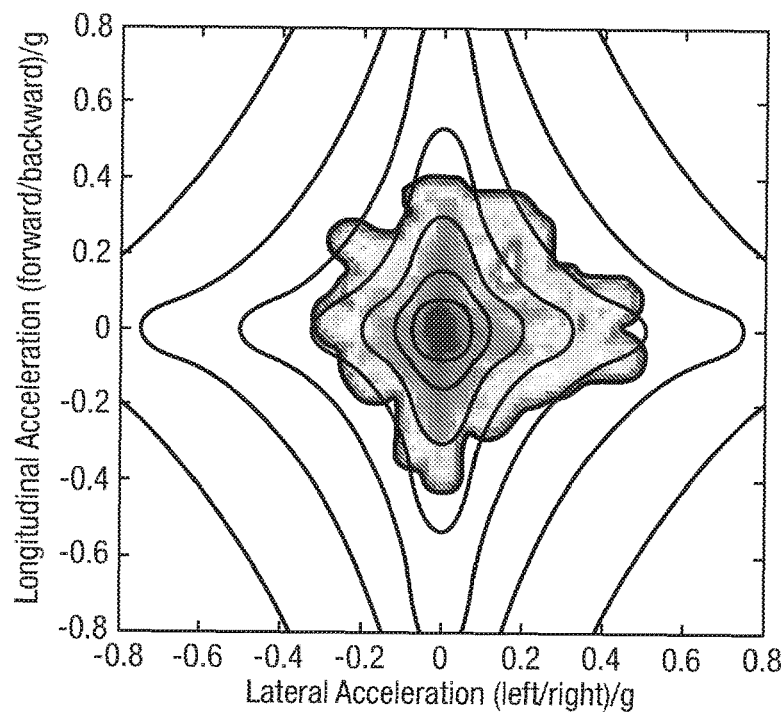
FIG. 5a is an example density plot of the acceleration correlation for a family car.
Figure 5B:
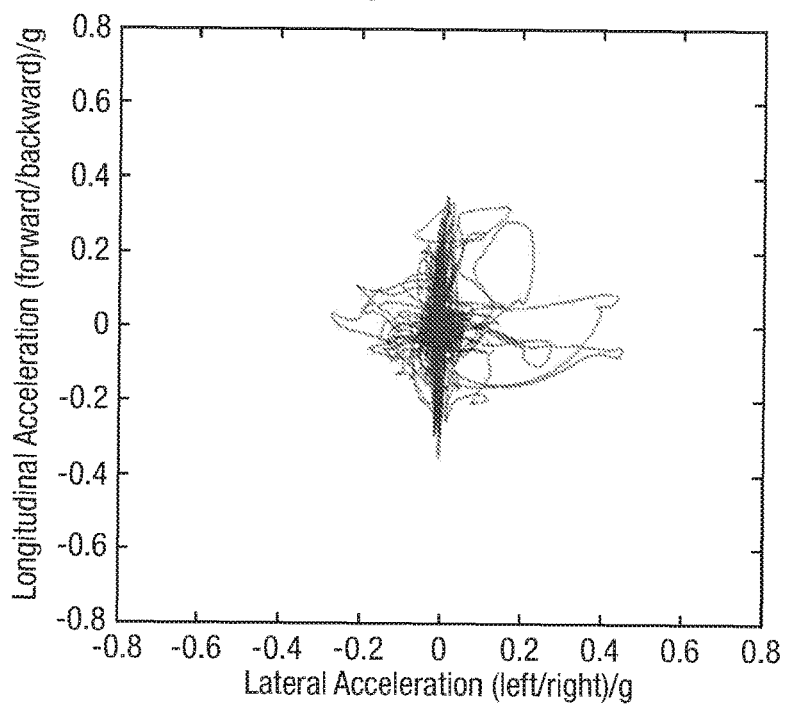
Figure 6A:
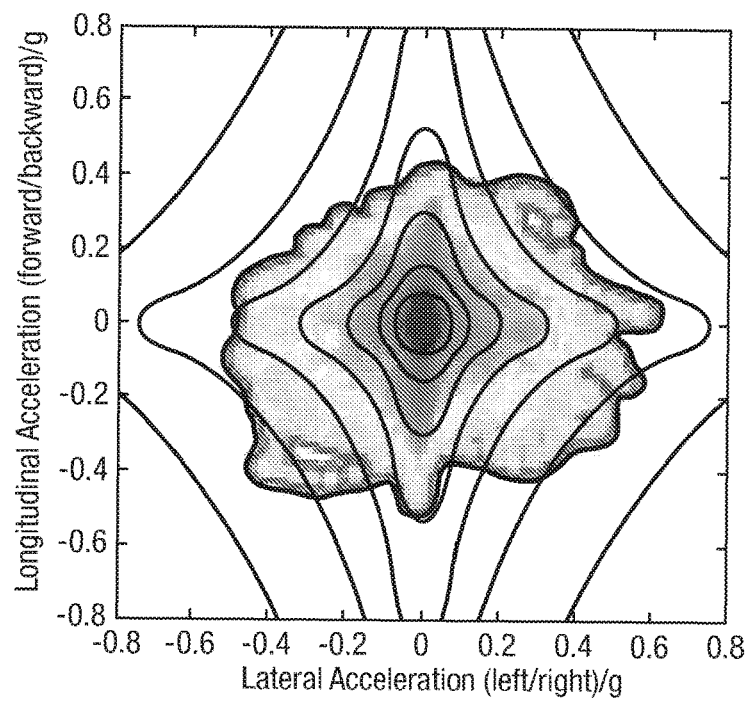
FIG. 6a is an example density plot of the acceleration correlation for a supermini.
Figure 6B:
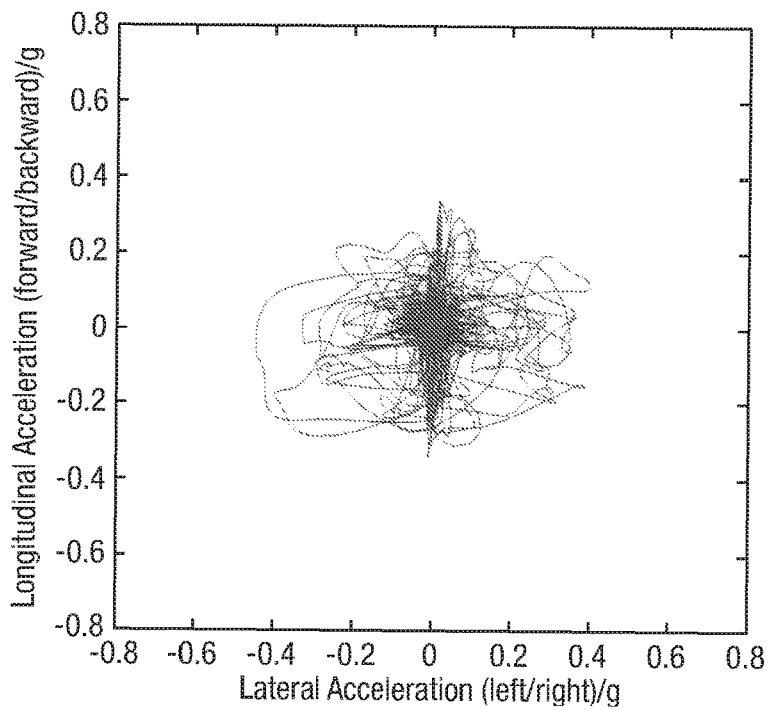
Figure 7A:
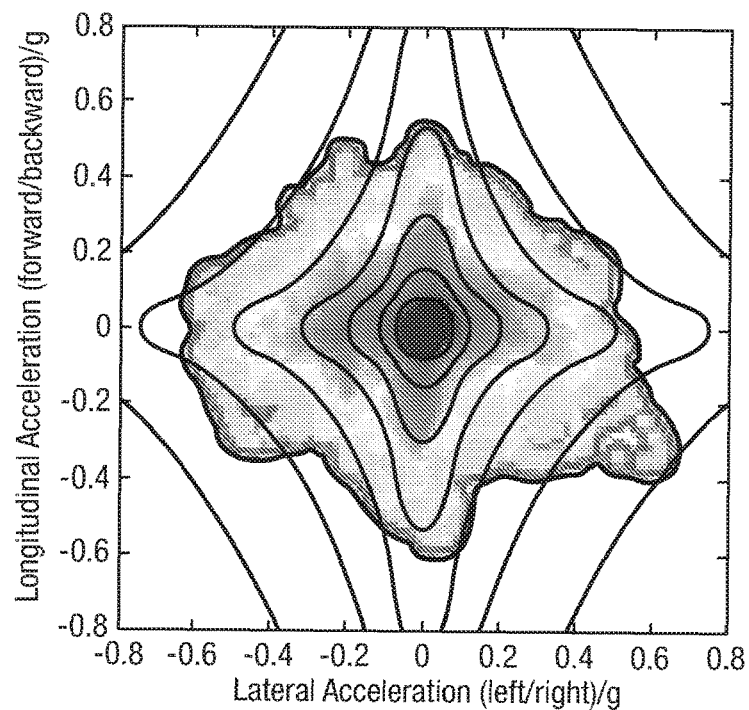
FIG. 7a is an example density plot of the acceleration correlation for an executive commuter car.
Figure 7B:
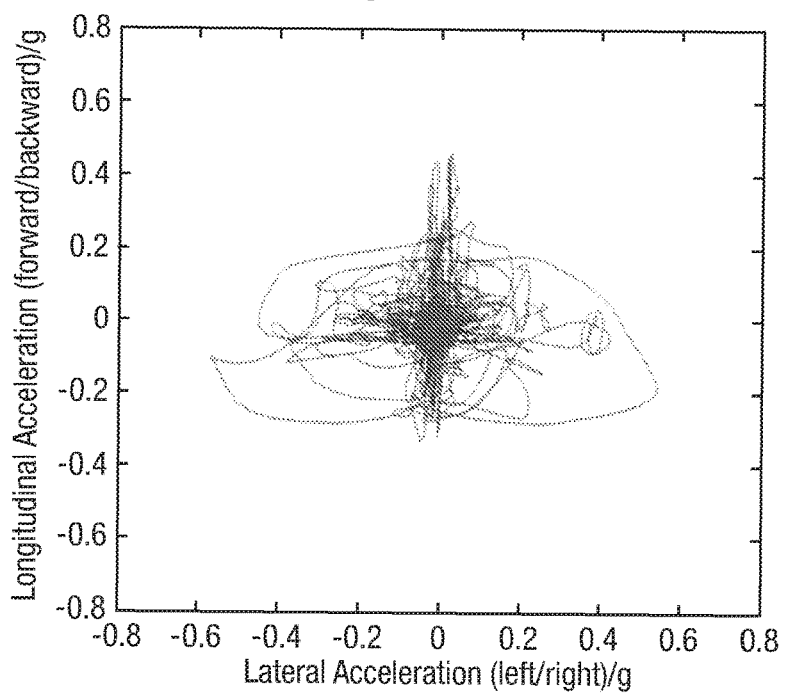

Various factors affect the distribution of this correlation, for example, journey type (motorways/autobahns or city centre traffic), the car (the power and traction available) and the driver (how safe or how exuberant a driver they are). FIGS. 5a, 6a and 7a are example density plots of the acceleration correlation for family car, supermini and executive car. The contours, over which the density plots of the acceleration correlation are overlaid, correspond to an idealized good driver. The line plots in FIGS. 5b, 6b and 7b indicate individual maneuvers. Using this acceleration analysis driver style and thus their risk profile can be determined with the monitoring device 2 optimised to only 'wake up' and log the higher-risk events (thus prolonging battery life).

Vibration Analysis

Two main sources of vibrations are picked up by the monitoring device 2. The first is the engine vibrations relating to the piston firing rate and the engine revolution count. The second is the wheel-on-road noise, that consists of a noise component and a component linked to the RPM of the wheels. Depending on the car design and quality of road, one or both of these may be visible. At higher speeds these signals become much clearer.

To properly interpret vibrations relating to engine revs it is necessary to convert from the observed frequency of vibration to the engine RPM. The conversion factor to do this will depend upon the configuration of the engine.

A vehicle engine may follow a two or four stroke cycle (cars are almost always 4-stroke, but smaller motorbikes are often 2-stroke) and consist of between two and twelve cylinders. If the stroke cycle and the number of cylinders is known the conversion is given by Equation (1), where the stroke cycle factor is two for a four stroke engine.

$$\left(\frac{\text{Engine Revs}}{rpm}\right) = 60 \times \left(\frac{\text{vibration frequency}}{Hz}\right) \times \left(\frac{\text{stroke cycle factor}}{\text{number of cylinders}}\right) \quad (1)$$

If the stroke cycle and number of cylinders is not known before hand, it may be estimated from the engine idle frequency, which is clearly observable. Knowing that the idle speed of the engine should fall into the range of 550 to 900 rpm, and that the combination of the stroke cycle factor and number of cylinders can only take a limited and discrete set of values, the most likely conversion factor can be deduced.

Usefully a validation means may be provided as part of an advanced "engine fingerprinting" signature where the device 2 is able to assess if the car it is attached to is actually consistent with what the customer has insured. This could represent a useful check immediately post 'pairing' to confirm that the car paired is indeed the correct car.

Journey Fingerprinting

Referring to FIGS. 9 and 10, in a particularly advantageous embodiment, the monitoring device 2, provides an output comprising respective event data, for each series of events, in conjunction with timing data indicating when the event has occurred in a manner that allows a 'contextual map' or 'journey fingerprint' to be built up, over time, of the chronological treatment of the vehicle with which the monitoring device 2 is associated.

The event data for each event is analysed and categorized into a number of different event 'streams', each having a related background circumstance associated with the events in that stream, to allow the journey fingerprint to be represented in a number of different ways to maximise the benefits both internally in terms of event analysis and characterisation, and externally to the end user. This categorization can take place on the monitoring device 2 itself, in the smart-phone 26, or at the server 50 depending on processing requirements and whether additional information is required from a local source (e.g. GPS data from a source on the smart-phone). The categorization may classify the event in terms of any useful classes but typically the event is classified in terms of a number of different background circumstance types including, for example:

A. Activity: (e.g. What is happening?)
B. Behaviour: (e.g. Who is responsible for how well the activity is happening?)
C. Context: (e.g. What is the context in which this is taking place?)

The context may take various formats, depending on what aspect of the context is of interest, (e.g. when is the event happening? Where is the event happening? or what is the environment in which the event is happening?)

The actual journey fingerprint can be compared with an expected journey fingerprint, after the journey, in order to detect anomalies, to determine how efficiently or well a particular journey is being, or has been, completed, and to identify weaknesses in a driver's capabilities. Such comparisons may be performed either within the monitoring device 2, the smart-phone 26 that the monitoring device 2 communicates with, or with a server 50 of a central cloud based service. Such a solution can dramatically save on system power, as the device 2 can be pre-programmed to only wake up at pre-determined points in its journey, based on known journey data, e.g. at a known driver transition or common manoeuvre, the device 2 can be programmed to wake and confirm that this activity has indeed been seen as expected. For example, the device 2 can be programmed to 'wake up' from a low power mode and enter, or remain in, a high fidelity data acquisition or 'log' mode (as mentioned previously) based on the detection of a predetermined event or sequence of events (i.e. based on being at a particular location in a particular predetermined event 'stream' into which the events have been categorized).

In order to conserve power, for instance, the monitoring device 2 may remain in a low power (or 'sleep') mode until a 'door close' event is detected, the device 2 may then enter a 'wait' mode for a predetermined time period to determine whether a vehicle start event and/or a vehicle in motion event has occurred. If the expected engine start event and/or vehicle in motion event does not occur within a predetermined time period the device 2 may, in effect, determine that the door close event was not a precursor to the vehicle being driven (e.g. it may have been associated with someone retrieving a belonging from the vehicle) and then return to a low power mode. Similarly if an engine start event is followed by an engine turn-off event (and possibly another door close event) without an intervening vehicle in motion event then the device 2 may return to a low power mode.

If the expected vehicle start event and/or vehicle in motion event does occur within the predetermined time period then the device 2 may enter a calibration mode (e.g. in which it calibrates itself to the direction of travel) and/or a data acquisition mode in which it begins to record data (such as journey associated data) at a higher rate than in the low power mode in order to track the vehicle and/or acquire driver behavioural data.

Similarly, if an excessive acceleration, excessive deceleration, and/or excessive speed event is detected (e.g. indicative of a crash, emergency manoeuvre, and/or anomalous driver behaviour) the device 2 may immediately enter a different data acquisition mode (e.g. in which data is acquired at a higher rate and/or in which additional information is acquired such as timing information to identify the start, end and or length of the event and/or the distance traveled during the event).

The context of the event may also feed into the way in which the device 2 acquires data. For example, the triggering of an excessive acceleration, excessive deceleration, and/or excessive speed event may depend on the 'location' context of the type of road the vehicle is being driven on (e.g. is the speed/acceleration/deceleration appropriate to the road?), the environmental context of the temperature in which the vehicle is being driven (e.g. is the temperature is indicative of potential icy conditions?) and/or the chronological context of when the event is taking place (e.g. is the time of the event a time when a curfew or driving restrictions have been imposed?).

Moreover, the behavioural categorization may be used to determine the way in which the device 2 acquires data. For example, the triggering of an excessive acceleration, excessive deceleration, and/or excessive speed event may depend on the identity of the driver or whether or not the driver is known.

In yet another example, the monitoring device 2 may be configured either to ignore or to further analyse certain event data acquired via the sensor in dependence on the categorization of that event data. For example, where the event data is indicative of vibrations associated with a certain type of engine behaviour (e.g. engine over-revving), and the event categorization indicates that the vehicle is stationary/empty with its engine off, the event data can be ignored thereby minimising 'false positives' (e.g. associated with a secondary source of vibration) and unnecessary entry to a higher power data acquisition mode. Contrastingly, where the event data is indicative of vibrations associated with that type of engine behaviour, and the event categorization indicates that the vehicle has its engine on, then the device can move into a higher power data acquisition mode to allow the behaviour to be analysed in more detail.

Thus, it can be seen that appropriate and accurate identification of events, and more specifically appropriate categorization of those events into a particular sequence of events, is key to further improving the ability of the monitoring device to provide valuable information whilst minimising the unnecessary acquisition of extraneous data and key to providing the associated benefits in terms of improved power efficiency. By ensuring that the monitoring device is 'context aware' (i.e. not only having knowledge of the specific event but also having knowledge of the contextual and/or behavioural background to the event, both pre- and post-event), the monitoring device can not only control the mode of the device, but can also provide greater clarity in predicting what has happened, with greater reliability and with greater accuracy.

In order to implement this event sequence driven analysis, the monitoring device may be provided with a state-machine which has a plurality of different states each corresponding to a different power mode/sensing level/system behaviour, where each new mode is triggered by an event, or sequence of events. Thus, as events and an associated sequence are identified (e.g. door activity→engine start→motion→anomalous acceleration/speed event) the monitoring device can move back and forth through the different states of the state machine. For example, to accurately determine a journey start in near real-time, the device resides in a low-power start-state until a door-close event is seen. It then transitions to an intermediate state to look for key vibrational characteristics of an engine start and/or the signature of a vehicle accelerating from standstill. As soon as this is detected it transitions state once again to a driving state, with corresponding changes to its trigger thresholds (and alerts shared with the corresponding App/smartphone/server). From this mode, it then assesses when the vehicle is stationary (moving to another intermediate possible-journey-stop state to help assess this). It then returns to the original start-state, awaiting another journey to commence.

It will be appreciated that where a state machine based implementation is used, a plurality of state machines could be provided in co-existence on the monitoring device and run in parallel. In this case each state machine could be responsible for a different function. For example one state machine may be configured to provide a near real-time alert to the App that a journey has started, as above. At the same time another state machine operates in parallel to detect when, mid-journey, the vehicle appears to have come to a complete halt (without triggering a journey stop alert unless there is a high level of certainty that the vehicle was not about to move off again shortly—e.g. vehicle stop for a pre-determined amount of time→engine off→door activity→no subsequent activity for a pre-determined amount of time, no smartphone response detected etc.).

This state machine approach therefore not only allows the local management of power budgets, and the provision of local internal alerts, but also allows valuable context to be provided to the event outputs. It will be appreciated that a similar state machine approach can be used beneficially on the monitoring device, App, and backend server. The overall system is designed such that this state machine approach can be dynamically shared amongst tag, App and server, with the combined solution being optimised in each case based on power budgets, the required transmit rate, the regularity of being able to communicate with a smartphone (and hence server) etc. Where realtime notification to the App is required, some local state-machine processing on the tag device is needed, whereas for other less challenging use-cases, more data can be passed to the App or server for processing.

Referring to FIG. 9 for example, this illustrates the way in which the event data may be analysed and represented for a typical telematics or similar scenario.

It will be appreciated that whilst FIG. 9 (and FIGS. 12 and 13 referred to later) show an advantageous possible graphical representations of event data that is enabled by the way in which the events are managed, categorized and 'streamed' (by activity, behaviour and context in this example), the event categorization techniques described herein have wider technical benefits beyond that of simply providing easier data management and visualisation. For example, as explained in more detail above, the event categorization techniques described herein allow significant improvements in the efficiency (in particular power efficiency) with which the monitoring device 2 acquires data, analyses the data to identify events, and communicates the processed data to the smart device/server. Specifically, as explained above, the categorization and streaming of the events allows the monitoring device to acquire, analyse and/or communicate data in a manner that is most appropriate (e.g. for optimum power consumption) to the nature of the event, or sequence of events, being detected.

As explained above, the monitoring device 2 is attached to the vehicle windscreen and measures vibration and acceleration. In this case a primary aim is to establish the "risk" profile of activity being performed for insurance purposes. There is also an opportunity to provide feedback to the driver as to how well they are driving or to capture the details of an accident or collision.

In this case, the event data may include, inter alia, data indicative of a variety of events including: engine turn-on/engine idling events; acceleration, speed and/or deceleration events; anomalous engine events (e.g. over revving); door open and/or close events; vehicle in use impact events (e.g. collisions while moving, windscreen impact events indicating a chipped or cracked windscreen); and vehicle not in use impact events (e.g. collisions while stationary such as 'bumps' while parked).

In the example of FIG. 9, the events shown in the representation are grouped into a number of event types for improved clarity including: a door opening/closing event type; an engine running type; a vehicle speed detected type; and a significant event detected type. It will be appreciated, however, that other type groupings are possible depending on requirements. FIG. 9b shows, by way of example, a number of different events that have all been grouped into the significant event type including: an excessive acceleration and speed event; a repeated high engine revs event; a 'bump' whilst parked event (e.g. indicating that the driver cannot be at fault); and a collision or 'crash' event (in which case, if the collision is of a sufficient severity, the emergency services may be called and location/crash severity information passed on to them automatically, by the smart-phone—if communications capable). In addition to, or perhaps instead of, this pseudo eCall functionality, the system could immediately notify the insurance company and they could try to contact the driver directly to check they are OK and notify them the claim process has already been started etc. This rules out the typical uncertainty of manually reporting an accident via claim forms, and the associated hassle of establishing blame etc.

In FIG. 9a the different event types are shown in an 'unexpanded' view as a single event timeline for a specific vehicle's journey.

In FIG. 9b the different event types are shown in a view that has been expanded, by activity category, into three different activity event streams or 'swim lanes', namely: a vehicle moving event stream; a vehicle stationary event stream (engine on); and a vehicle parked (engine off) event stream.

In FIG. 9c the different event types are shown in a view that has been expanded, by behaviour category, into three different 'behaviour' event streams or 'swim lanes', namely: an unknown driver event stream; a first named driver event stream; and a second named driver event stream. It will be appreciated that there may be other behaviour streams for other named drivers or other behaviour categories. Each driver is identified based on a behavioural profile built up over time for that driver. Whilst a driver may not be identified immediately at the start of a particular driver's journey in the vehicle, this may be inferred once the vehicle has been driven for a period of time, whereby the driving style has been identified and hence the app display can be 'back-dated' appropriately with this updated information (i.e. transferring this section of the driving log from "unknown" driver status to "driver A" or similar. Supporting information is also used to enhance this picture, by using additional events such as detection of car doors opening and closing whilst the vehicle is stationary (hence meaning that the driver could have changed, and hence triggering a reassessment of the driving style seen).

In FIG. 9d the different event types are shown in a view that has been expanded, by context category, into a number of different 'context' event streams or 'swim lanes' for each of three different context types: a location context type; a time context type, and a temperature context type. For the location context type the view has been expanded, by context category, into three different 'location context' event streams, based on GPS data, namely: a city centre event stream; a dangerous road event stream; and a motor way ('freeway') event stream. For the time context type the view has been expanded, by context category, into three different 'time context' event streams, based on timing data, namely: a day event stream; a dusk event stream; and a night event stream. For the temperature context type the view has been expanded, by context category, into three different 'temperature context' event streams, based on temperature data, namely: a warm ambient (>5° C.) event stream; a low temperature (0-4° C.) event stream; and a freezing (<0° C.) event stream.

FIG. 10 shows a further example of how the information available from the journey fingerprint may be represented for a longer time period, expanded, or reviewed in more detail by an insurer, vehicle owner or driver.

Figure 10A:
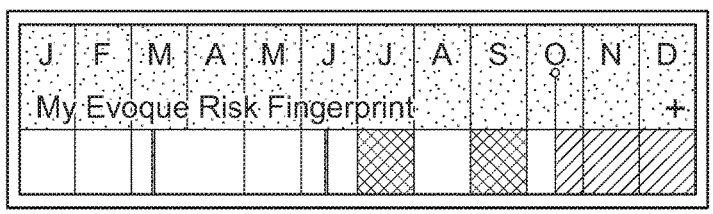
FIG. 10 is an illustration of other ways in which event data may be analysed and represented.

FIG. 10a shows a 'zoomable' "DNA barcode" that shows changes in risk/cost characteristic for a driver over a 12 month time period. As is common with modern apps, this image can be 'swiped' left-right to select the timeframe of interest, wherein it can then be 'pinch-zoomed' accordingly.

Figure 10B:
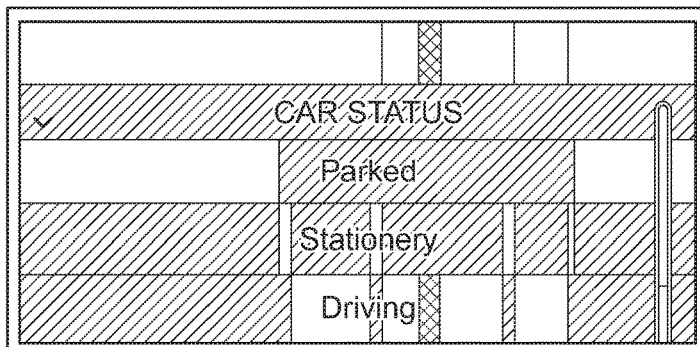

FIG. 10b is similar to FIG. 9b showing how the risk/cost characteristic for a particular vehicle over a particular journey on a particular day can be represented as a contracted (single time-line) 'barcode' or an expanded 'barcode' that separates out key characteristics into individual activity 'swim-lanes' or event streams.

As explained above, such characteristics may be 'summaries' of information (event types) conflated from a number of 'sub-level' characteristics (specific events). These 'sub-level' characteristics may in turn be expanded to show further levels of detail.

Figure 10C:

FIG. 10c shows how simplified data can be provided for a specific period or event. In the example the total period traveled, distance traveled and premium saved are provided.

Figure 10D:
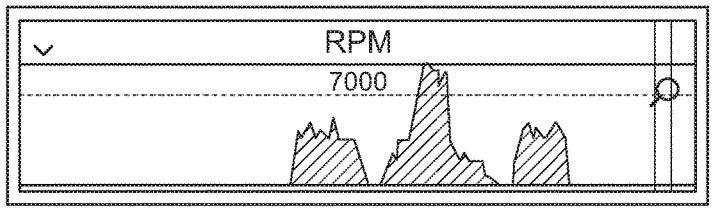

FIG. 10d shows a data plot of how a characteristic (in this case RPM) inferred from vibration data changes over time.

Figure 10E:
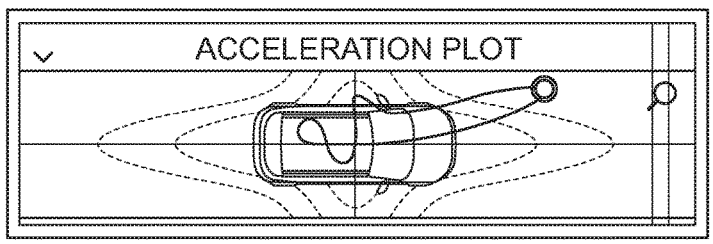

FIG. 10e shows a 2D plot of how two characteristics (forward and sideways acceleration) vary together for a particular event or time period.

Figure 10F:
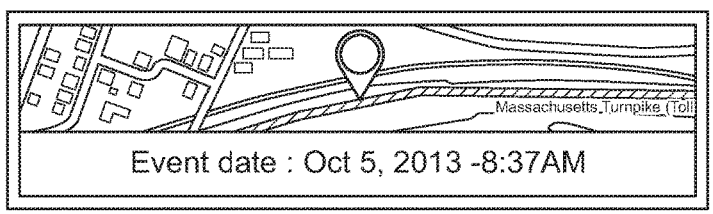

FIG. 10f shows how the 'barcode' risk type information can be overlaid over mapping data (e.g. a GPS map) to illustrate how risk changes over a particular route thereby allowing a driver to modify their behaviour based on detailed risk information gleaned from their regular journeys.

The manner in which the telematics event data is used in this example is significantly advantageous, compared to conventional OBDII type 'black box' type tracking methods, because the output from the monitoring device 2 allows a more detailed picture of the vehicle's usage to be built up, including, for example, information relating to events that occur when the vehicle is not being driven (and when the ignition is off, typically depowering the OBDII type blackbox solutions) and information identifying driver change over events that allow responsibility for particular events to be attributed appropriately and insurance premiums to be tailored appropriately based, for example, on average miles driven by each named driver in combination with the risk profile for that driver gleaned from the event data collated over time.

It can be seen, therefore, that the technique for managing data received from the monitoring device 2 beneficially involves processing event data to identify the events and to determine a respective event type for each identified event, and a plurality of background circumstances (e.g. vehicle driver, time of day, where the vehicle is being driven, environmental conditions such as temperature, vehicle stationary (engine on), vehicle parked (engine off) etc.), associated with the event. The event data may be output, e.g. to a visual display, in a single event stream representing all the identified events or as a plurality of event streams each event stream including events having a particular background circumstance associated with them. This simplifies management of the data considerably as it allows events having a particular background circumstance associated with them to be identified and analysed separately from having a different background circumstance associated with them. Each event may have a number of different background circumstances associated with it, each background circumstance being selected from a set of background circumstances of a particular type (e.g. activity, behaviour and/or context).

Conclusion

The monitoring device and associated apparatus and methods disclosed enable the accurate assessment of driver behaviour in a manner that is advantageous both to the driver and the insurer and/or vehicle fleet owner. The impact of this approach for the vehicle insurance sector could be significant, as the claimed monitoring devices are able to detect information not previously possible with smart-devices alone.

This solution could realistically provide a "one-solution-fits-all" platform, significantly enhancing the current App-only solutions, and potentially replacing many high-cost black-box applications. The small/flat form-factor of the monitoring devices could realistically be offered to all drivers, with the device perhaps being shipped with the annual renewal documentation.

By embracing such a low-cost, robust, risk-analysis solution, insurance companies could offer their customers potentially game-changing cost-savings on their premiums, without exposing themselves to any additional or unacceptable risk.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

The monitoring device could detect the type of vehicle, for example, its engine type or size or dynamic capabilities. This could help reduce fraudulent claims. For example it could help with the detection of "chipped engines" and other after-market work done to a vehicle. Driving styles could also be distinguished so it would be possible to infer who is actually driving and what their typical risk characteristics are, for example, that they are elderly drivers. Such analysis can include journey risk-contour plots, with detailed comparisons to known profiles, and even ad hoc analysis of sporadic behaviours.

It will be appreciated that the power management component 24 running on the device may be used such that only crucial events are logged, with suitable alerts being raised via Bluetooth to the driver's smart-phone, which then in turn shares the data with the secure remote server when it is able to do so (e.g. in areas of free Wi-Fi or when the cellular connection is free). Whilst the smart user communication device may be a general smart-phone device, it may also be a preprogrammed dedicated smart communication device specifically configured to be used with the monitoring system described.

Whilst power is described as being provided by a coin cell type battery, it will be appreciated that power may be provided by any other suitable means in combination with or as an alternative to a coin cell. For example, the power efficiency of the monitoring device advantageously allows power to be provided via a solar cell. Power could also be provided via the vehicle's battery using a connection into the vehicle's electric system via a 12 v 'cigar' socket, or via the on-board-diagnostics (OBD/OBDII) port.

Moreover, it will be appreciated whilst the use of a monitoring device in conjunction with a separate smart device such as a mobile telephone (smart-phone), is particularly advantageous. A single 'black box' solution may be provided in which the relevant smart-phone functions (the functions of the app and the communication capabilities) are integrated with the sensor and processor as a single unit that provides the functions described above. The functions and capabilities described may be implemented in software, hardware, firmware, or a mix of these.

Whilst the windscreen mount location is particularly beneficial both in terms of visibility of device and vibration related data acquisition, the monitoring device could be configured for mounting in any other location on a vehicle (including being built into the vehicle itself) where vibrations are induced while the vehicle is in motion. The monitoring device could be configured for mounting on (or embedded within) any appropriate rigid point on the vehicle body, chassis or components. For example, the monitoring device could be configured for mounting to other location such as a door sill, chassis cross-brace, or even the steering wheel or dash board. It will be appreciated that windscreens could be provided with the sensor part of the monitoring device embedded within it and other parts of the monitoring device provided separately but connected to the sensor device.

In the above embodiments, the mobile devices are smart-phones. It will be appreciated that the above embodiments could be implemented using devices other than smart-phones such as, for example, personal digital assistants, laptop computers, web browsers, tablets, etc.

It is anticipated that new vehicles may be required to have a facility to call the emergency services in a severe crash (for example one where airbags have been deployed). The device could provide similar crash data. The device could also be used to provide similar eCall functionality, as an 'aftermarket' or 'retro-fit' feature, via the smartphone thereby enabling older cars to be retrofitted with similar functionality.

It will be appreciated that whilst the above description is primarily concerned with a vehicle telematics embodiment in which a monitoring device or 'tag' is configured for attachment to a vehicle, the technology described herein has much wider applicability. It is envisaged, for example, that a monitoring device may also have uses outside the field of vehicle telematics. In this more general context, the monitoring device may be configured for attachment to an item to be monitored, the monitoring device comprising a sensor for sensing a condition relating to the item, and a detector for detecting a predetermined event relating to the condition, the sensor being arranged to gather data concerning the condition for a time period following detection of the event by the detector, a data processor, a memory arranged to store the data, and a communication interface arranged to generate a wireless signal for transmitting the data.

In more detail, examples of other potential applications include:

Logistics. There is a need to check whether shipments (e.g. comprising parcels or packages) have been handled safely and appropriately during transport. For example, an article may be damaged if the parcel is dropped or exposed to extremes of temperature or humidity. A customer receiving an article generally is required to perform a brief manual inspection of the article before acknowledging safe receipt. However some types of damage are easily overlooked during such inspection and may not come to light until a later date. Other types of damage, such as deterioration of a substance caused by incorrect storage, may not be ascertainable from inspection. Furthermore, if the article has been damaged, it may be difficult or impossible to ascertain when during the delivery process the article became damaged, which may for example lead to disputes between a customer, and/or various handling entities such as a delivery company or manufacturer. In one application of the technology, therefore, a monitoring device is provided in or on an article such as a letter, parcel, shipment, consignment, package, tote, thermal packaging (active or passive), or other shipping container, to monitor its condition and/or en route treatment.

Cold chain pharmaceuticals. The delivery of many drugs is temperature dependent—i.e. if the temperature of a container is allowed to drift above a certain value, the drugs then become inactive, even though there is no visible indication of this. The device of the invention could provide a 'real-time' temperature (or other condition) alert during transit, or a smartphone could be used to check condition before delivery to a healthcare professional, or even by an end user such as a healthcare professional or patient (e.g. a "don't administer" warning could be provided if the drugs have been subject to certain temperature or other events). In such an embodiment, for example, the monitoring device may be configured for attaching to a medical shipment sensitive to temperature or shock such as a drug shipment, vaccine shipment, organ, or other biologic or non-biologic shipment. An event such as temperature exceeding or falling below a predetermined threshold for a particular drug or the like, or a shock event, or cumulative shock over time, exceeding a predetermined threshold, may trigger data acquisition and/or an associated alert.

V2V, or Vehicle to Vehicle communications. The device could be used as an aftermarket add-on to allow cars to communicate with each other—i.e. if one sensor detects a skid event, it can share a warning of icy road conditions via the network of similarly enabled monitoring devices to other nearby cars (including those going in the opposite direction). V2V is a system being developed in the automotive sector by the major OEMs, but widespread adoption may well be limited if only available on new luxury cars. The device would be a low-cost (but less capable) alternative to facilitate the growth and acceptance of the V2V device market.

Train integrity/positioning. There is a need for train operators to know if all train carriages remain connected. Current signally relies on detecting the rear lamp on the end carriage before opening up a zone of track. If the device is made to be robust, the range limit of around 50 m could be advantageous, whereby an adhoc mesh of devices could be formed, with a device affixed to each carriage. If the carriages did part, the network would be broken, and an alert raised. Such a system could also provide a more accurate representation of the total length of the train, based on how many devices are visible.

Equipment monitoring. The device could be used to provide monitoring for equipment such as power tools, manufacturing equipment, and the like. For example, the monitoring device may be configured for attaching to a piece of equipment intended to be used many times such as pneumatic drill, or a train door, or an impact tool, or an elevator, or a building door. The device may, for example, monitor for fault conditions, out of pattern behaviours: by comparison against a 'normal' profile where the 'normal' profile may be represented by predefined thresholds; by comparison against other equipment of the same type or installed in a similar environment; or by comparison against historical performance of the equipment being monitored.

Building efficiency monitoring. In another example, the device may be configured for attaching to a door or other entrance to a room or a building, for the purposes of establishing whether the building is being used efficiently. The device may, for example, detect 'door opening' and/or 'door closing' events via an accelerometer for use in determining whether energy efficient use is being made of the building. Similarly, a device could be configured for sensing temperature changes in a room for use in heat management decisions (there could be more than one sensor in a room).

Optionally the monitoring device may include one or more security components, for the purposes of verifying messages from other systems such a smartphone or server, or confirming the authenticity of the device to other systems such as a smartphone or server. Digital keys used by this security component(s) may include symmetric keys for short range radio links to another radio-enabled device (for instance a bluetooth link key), symmetric keys for links with multiple hops such as via a smartphone to a server, or public/private keypairs with associated algorithms such as ECDSA or ECDH for applying digital signatures to data generated by the device, verifying signatures applied by an external system such as a server generated firmware upgrade or control message, or for key exchange or key transport to set up efficient session keys for block or chained encrypted sessions, using algorithms such as AES. An off the shelf discrete security chip such as the Atmel ECC108 or Infineon Optiga may act as a secure container for these digital keys, including tamper resistance and RF/timing attack resistant features.

The device may be embedded within a material as part of a manufacturing process, such that the manufacturing and assembly processes can be optimised, thus potentially leaving the redundant device within material post-manufacture.

Figure 11:
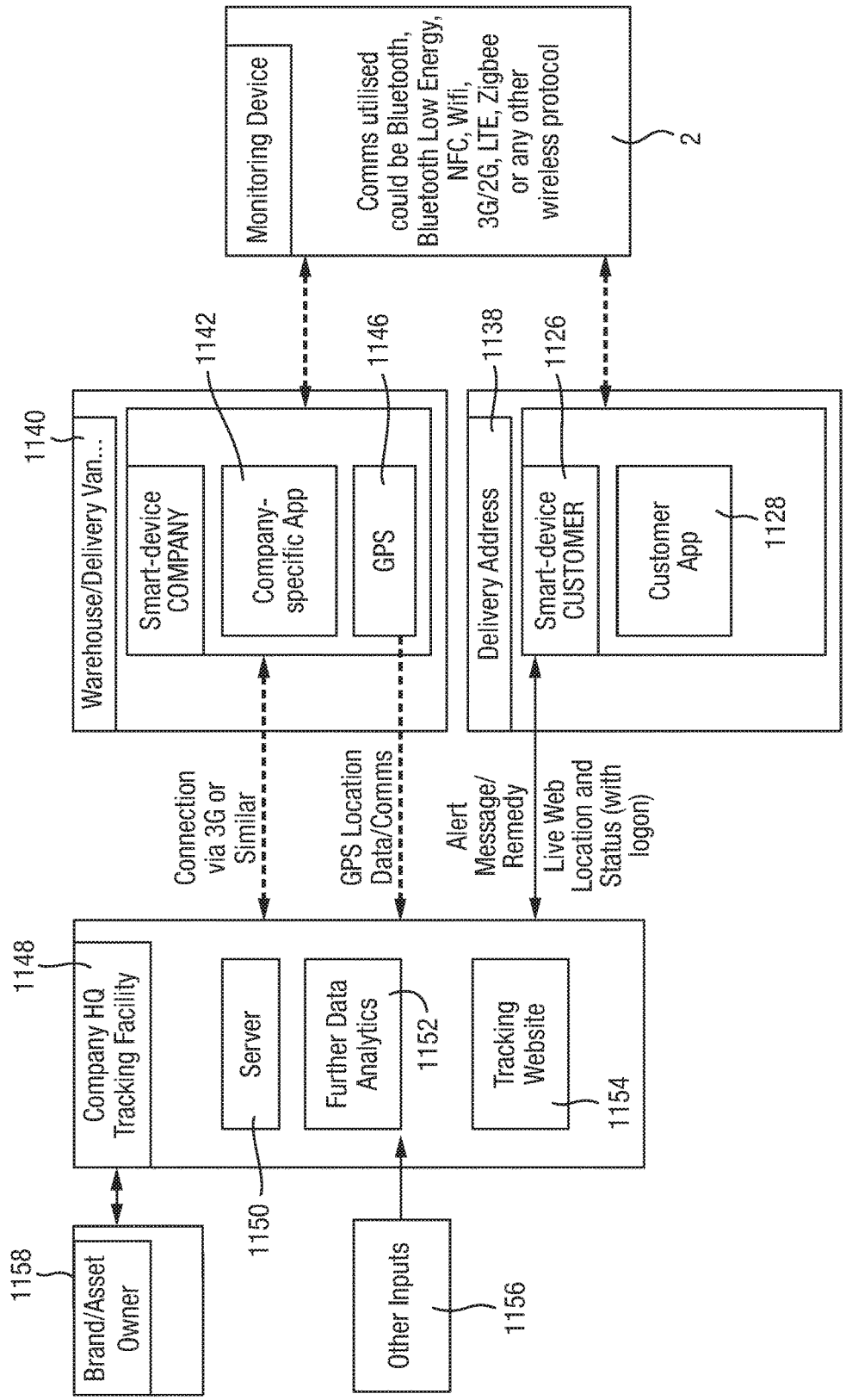
FIG. 11 illustrates a monitoring system for another application.

Referring to FIG. 11 which illustrates a monitoring system for a logistics application, in the logistics example summarized above, an event may be triggered at the onset of acceleration or deceleration exceeding one or more predetermined thresholds, which is distinct from normal background levels indicating normal or acceptable handling of a parcel or package. For a severe drop event (one where a predetermined acceleration is exceeded), the stored data may be restricted (e.g. to save memory, power and/or other resources) to the maximum value of the acceleration, the height of the drop, and the time of the drop. For a less violent event, more data may be stored since more data may be needed to provide useful information about the nature of the event and to determine the severity of the event and therefore advise whether or not the parcel has been correctly or well handled.

Upon delivery, a customer may be provided with the ability to interrogate the monitoring device, for example by starting a dedicated app 1128 on their own smart device (e.g. smartphone 1128) at the delivery address 1138, in order to verify the condition of the parcel before signing for it. The app 1128 may, for example, display critical events (if any) which have occurred during transit in an appropriate manner such as by providing a page with a summary of the package condition and/or a page with a detailed time/severity log plot, enabling the customer to make an informed decision whether or not to accept the parcel as undamaged. Furthermore if the parcel should not be accepted, the app 1128 may show exactly what happened to the parcel and when, and hence prevents the usual ambiguity of responsibility when there is a complex logistics chain.

In the logistics example, the monitoring device can be inserted within a package to avoid tampering issues and ensure the data relates to the content of the package and not the packaging itself. Alternatively the monitoring device could be included within the construction of a fragile object for example a smart television.

As seen in FIG. 11, in the logistics example, the system may include a tracking facility associated with a 'headquarters' 1148 of a company having an interest in the transport of the package, such as a delivery company. The tracking facility may provide the server 1150 such as a cloud server, which could for example allow remote monitoring of data relating to the package through a company smart device 1144 located in a delivery van or at a warehouse 1140, preferably being GPS enabled, interrogating the monitoring device 2. The location of the package may be derived from a GPS device 1146 associated with the smart device 1144 if the smart device is in the interrogation range of the monitoring device 2 (e.g. at an approximate maximum range of 50 m indoors for Bluetooth Smart). The monitoring device 2 may thus be interrogated at any stage of the logistics delivery process by use of a company-specific app 1142 on the smart device 1144.

The tracking facility 1148 may be provided with further data processing equipment 1152 for processing the date remotely. Such data processing can use more powerful algorithms since processing power and power consumption will not be limited as for a portable device. Furthermore other sources of data 1156 may be used to supplement the data from the CMD. Location and condition data retrieved in this way could remove the need to physically inspect and handle packages, increasing the speed and efficiency of logistics processing for example by replacing the need to scan barcodes in warehouses etc. Other interested parties 1158 such as manufacturers, brand owners, or asset owners may also be able to access data via the tracking facility 1148.

Furthermore the company can react to sensed incidents pro-actively, for example reordering an item, sending a message or alert informing a customer of potential damage, etc. In addition the facility may provide a website 1154 for use by customers to track the condition and location of a package, which could potentially be independent of any specific carrier. In the case where the monitoring device 2 is incorporated into the item by the manufacturer, the manufacturer may also be able to remotely connect with the monitoring device 2 to check its condition, thereby enabling the manufacturer to assess warranty claims during delivery, installation and subsequent use.

The communication interface may be configured to have a low periodicity that is a compromise between the transmission frequency and acceptable retrieval probability on a corresponding smart device, in order to conserve battery life. The interface may be provided with dynamic optimisation of the 'advertising event' periodicity in order to transmit the advertising event at a higher rate when a typical delivery event is detected. Thus the processor may use a profile of data from the sensor(s), for example from the accelerometer, to infer whether the parcel is being transported in a van or being carried, and adjust the periodicity accordingly. For example if the parcel is being carried after a period of being in a van then the periodicity may be increased to better enable swift communication with a smart device, since it is likely that a customer will want to interrogate the tag at that time.

There are of course many other circumstances of combinations of circumstance which can be inferred from processing of the sensor data which may indicate that the monitoring device is about to the interrogated and the periodicity should be increased, or vice versa. As another example, the device may be configured such that by tapping on the box or shaking it gently at a predetermined frequency (chosen to be different to those frequencies usually seen in transit due to road vibrations etc.) the device could be 'woken' from its sleep mode immediately. Thus if the item needs to be interrogated and the sensors haven't detected a typical delivery event, the package can be gently tapped/shaken to 'wake' the device thus causing it to transmit in high-rate mode.

In summary, the monitoring device may be configured for mounting to any suitable item (such as a vehicle in the telematics example or a parcel in the logistics example) to monitor the treatment of the item during normal/abnormal operation, and for being powered by a cell. The device may comprise a sensor for sensing a condition relating to the treatment or use of the item, a memory arranged to store sensor data, and a communication interface arranged to generate a wireless signal for transmitting the data, the device further comprising a detector for detecting a predetermined event relating to the condition, and the device having a low power mode and a high power mode, the power consumption of the device being relatively higher in the high power mode, in which the device is triggered to switch from the low power mode to the high power mode for a finite time period following detection of the predetermined event, and to switch from the high power mode to the low power mode upon expiry of the time period, and in which high power mode the device is configured so as to be operable to do at least one of: read sensor data at an increased rate in order to gather sensor data; send a communication signal at an increased rate for establishing a connection for transmitting data; select a most relevant power-management algorithm; and/or choose a correct service flow/communication protocol method.

Thus with the device attached to the item (such as a parcel or package or an object within the parcel or part of a vehicle), it may be in a low power or 'sleep mode' until a relevant event takes place, such as a threshold value of the condition being exceeded, when the sensor will trigger the device to 'wake up' and start buffering data concerning the condition, such as the acceleration experienced during a freefall. The device therefore can be designed to use very little power, such that it may be powered by a single coin cell battery for a long period such as several weeks or months, whilst still capturing data concerning key events with sufficient resolution to be useful for example in accurately detecting peak accelerations.

Alternatively or in addition, the device in the low power mode may send 'advertising' signals at a relatively low rate, and may be triggered to increase the rate of the signals upon detection of an event indicating that the device is about to be interrogated, such as the item being moved indicating a delivery event, again enhancing performance whilst saving power.

The detector may thus be an integral part of the sensor such as an accelerometer, or a temperature or humidity sensor, or orientation sensor such as a gyro or compass. Alternatively the detector function may be implemented via a separate simple or 'dumb' sensor coupled to the power management algorithm, which may enhance power saving. The device may comprise one or more further detectors/sensors associated with a plurality of conditions or events.

The communication apparatus preferably uses short range wireless radio technology such as Bluetooth, and is provided with a clock. The communication apparatus may be arranged to operate with a wireless communication technology having a relatively low unimpeded indoor range of up to approximately 50 meters (e.g. between ~40 meters and ~60 meters), operating in a frequency band of ~2.4 to 2.5 GHz, and/or having a bit rate of approximately 200 kbit/s (e.g. between 180 kbit/s and 220 kbit/s). The communication apparatus may be arranged to operate with a wireless communication technology having a lower bit rate than conventional Bluetooth. The communication apparatus may be arranged, for example, to operate with a wireless communication technology complying with the Bluetooth Smart protocol, in order to save power. Thus the communication 'advertising event' can have a pre-configured low periodicity.

The communication apparatus preferably uses a short range, low power wireless radio technology such as Bluetooth Smart, now common in new smart-phones and tablets. The communication apparatus may be arranged to operate with a configurable low-frequency transmit rate, in order to save power. Thus the communication 'advertising event' can have a pre-configured low periodicity.

The device may be arranged to monitor the sensor data to infer aspects of the delivery event; for example to determine when a package is being transported in a van, delivered by a person walking etc. so that the advertising frequency may be set and/or adjusted appropriately. The device preferably includes a data processor and a power management component.

Preferably the nature of the data stored in the memory is determined in dependence upon the nature of the sensed event or condition, and the time period for which data is gathered by the sensor is either a predetermined time or may also be dependent upon the nature of the event or condition. Data relating to the time at which the condition or event was sensed is also preferably stored in the memory. For example for an extreme event the stored data may comprise a simple maximum value and time value, whereas for a less severe event the data may comprise a condition profile over a longer time period.

Also described herein is a system including the device, a portable smart device configured for communication with the device, and a remote server configured to communicate with the smart device to obtain the data. Thus, in the case of the logistics example, a delivery company may interrogate the device remotely via a smart device such as a phone in a delivery van or warehouse. The portable smart device is preferably associated with a GPS device for providing information concerning the location of the device to the system.

The server may, for example, be configured to include features such as digital key management for data confidentiality, authentication of devices and users, and anti-counterfeiting measures. It may also include an analytics engine for processing data. It may also include user interfaces for administration or consultation of data or events. It may also include an alerting mechanism for distributing data, events, or web links to data or events via SMS, email or other messaging systems.

It will be appreciated that the method of utilising the event data from the monitoring device described with reference to FIGS. 9 and 10 above may be particularly advantageous in a number of other different use cases including, inter alia:
  Logistics: parcels, letters, goods, produce
  Vehicle fleet management (e.g. for vehicle hire as well as large service fleets)
  Cold Chain Logistics: medicines, food and other perishables
  Condition Monitoring: monitoring of assets, typically industrial, but potentially also consumer
  Active Control: monitoring and control of tools and assets, typically industrial, but potentially also consumer This is illustrated, for example, in FIG. 12 in which a number of generic 'events' are shown that are grouped into a number of event groups or 'types' (event groups 1 to 5) for improved clarity.

Paralleling what is shown in (and described with reference to) FIGS. 9(a) to (d), FIG. 12(a) shows the different generic event types in an 'unexpanded' view as a single event timeline for a specific article's journey. In FIG. 12(b) the different event types are shown in a view that has been expanded, by activity category, into three different activity event streams (activities 1 to 3) or 'swim lanes'. In FIG. 12(c) the different event types are shown in a view that has been expanded, by behaviour category, into three different 'behaviour' event streams or 'swim lanes' (behaviours 1 to 3) based, for example, on the identity of a person or group of people responsible at the time of the event. In FIG. 12(d) the different event types are shown in a view that has been expanded, by context category, into a number of different 'context' event streams (contexts 1,1; 1,2; and 1,3 and 2,1; 2,2; and 2,3) or 'swim lanes' for each of two different context types (context types 1 and 2). For context type 1 the view has been expanded, by context category, into three different event streams (contexts 1,1; 1,2; and 1,3). For context type 2 the view has been expanded, by context category, into three different event streams (contexts 2,1; 2,2; and 2,3).

Another specific application of the method of managing data will now be described with reference to FIG. 12, which illustrates the way in which the event data may be analysed and represented for a typical logistics or similar scenario.

This example is focussed on logistics monitoring and control for parcels and goods. In this case, the primary journey fingerprinting is around the modes of transport and how assets are handled during the journey. Thus a representation of the journey fingerprint might look like that shown in FIG. 12.

In this case, the event data may include, inter alia, data indicative of a variety of events including: anomalous handling events; journey start and journey end events; change of transport type events; transport events (e.g. events indicating a transport vehicle collision); environmental events (e.g. over temperature/over humidity); and/or the like.

In the example of FIG. 13, the events shown in the representation are grouped into a number of event types for improved clarity including: handling event types; road transport event types; air transport event types; and a significant event detected type. It will be appreciated, however, that other type groupings are possible depending on requirements.

Figure 13C:
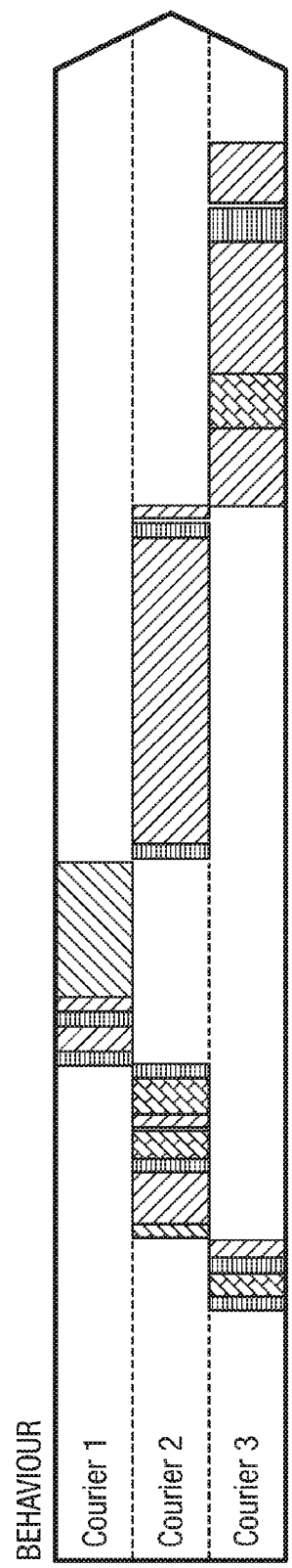
FIG. 13 is a diagram of an example journey fingerprint for a typical logistics scenario.
Figure 13D:
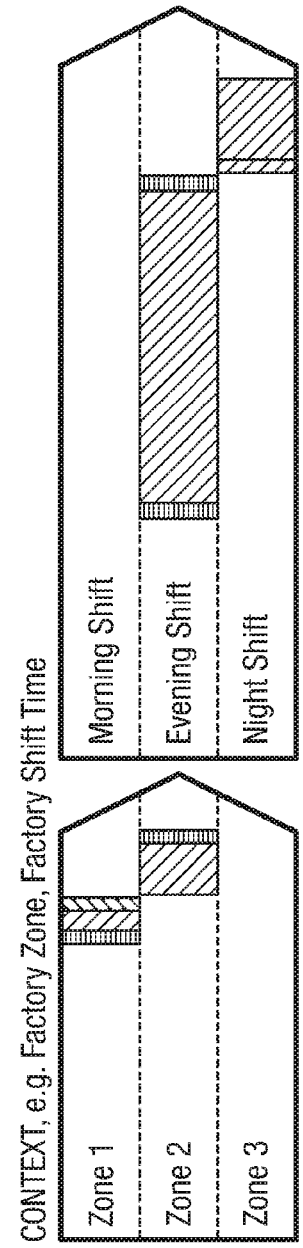

In FIG. 13(a) the different event types are shown in an 'unexpanded' view as a single event timeline for a specific article's journey. In FIG. 13(b) the different event types are shown in a view that has been expanded, by activity category, into three different activity event streams or 'swim lanes', namely: an air freight event stream; a road freight event stream; and a handling event stream. In FIG. 13(c) the different event types are shown in a view that has been expanded, by behaviour category, into three different 'behaviour' event streams or 'swim lanes' based, in this example, on the identity of a courier transporting the goods. Additional event streams for additional couriers (or fewer event streams for fewer couriers) are of course possible. In FIG. 13(d) the different event types are shown in a view that has been expanded, by context category, into a number of different 'context' event streams or 'swim lanes' for each of two different context types: a factory zone context type; and a factory shift context type. For the factory zone context type the view has been expanded, by context category, into three different zone event streams (which may, for example, represent warehousing zones, incoming shipments zones, outgoing shipments zone, or the like, or a combination thereof). For the factory shift context type the view has been expanded, by context category, into three different 'shift' event streams, based on timing data, namely: a morning shift event stream; an evening shift event stream; and a night shift event stream.

The actual journey fingerprint can be compared with an expected journey fingerprint, after the journey, in order to detect anomalies, to determine how efficiently or well a particular process is being performed, and to identify weaknesses in a particular process through which the monitored article (e.g. parcel or package) is being processed. A similar procedure can also be done substantially in real time to assist in operational decision making.

It will be appreciated that the different event types and event streams are purely exemplary and may represent any suitable events and/or groupings of events. Similarly, the event data may be expanded by any suitable activity type, behaviour type or context type (or any other classification) as appropriate which may be sub-divided into any suitable number of event streams.

It will be appreciated that the logistics implementation encompasses activities beyond the vehicular transport chain. It can also include movements within factories as goods are assembled as well as the secure activation, authentication and warrantee compliance of the goods by the end-user. Thus the journey fingerprint can be specifically tailored to accommodate many different users and use cases.

The manner in which the event data is used in this example is significantly advantageous, compared to conventional logistics type tracking methods, which may use barcode, radio frequency identifier, and/or other identifier scanning at a number of discrete time points during the journey of a package or other article, because the output from the monitoring device, being driven by events affecting the article with which the monitoring device 2 is associated rather than by scanning opportunities, allows a detailed picture of the article's treatment to be built up that is not restricted by location, time or the availability of scanning resources. For example, a conventional tracking method may provide a number of discrete scanning opportunities when the article reaches certain specified locations (e.g. a warehouse, airport, delivery address or the like) but does not provide visibility of what is happening, or has happened, to specific articles during transit between those scanning opportunities.

The benefits of capturing and displaying such data in this way include:

Cost savings; made possible by the reduction in scan/check operations needed, for example sufficient certainty of operation can be established using this Journey Fingerprint approach, such that more 'costly' (in financial and/or power budget terms) assessment options, e.g. GPS checking, or personnel confirmation sequences can be minimised, and potentially avoided altogether Time savings. In a similar way to cost, operations can be minimised or eradicated altogether (e.g. barcode scanning, product and/or personnel verification scans etc.) thus saving processing time The journey fingerprinting techniques described may be applicable to the other use cases mentioned above also.

In one example, a cold-chain variation of the logistics use-case may be focussed on the temperature, humidity, and/or physical handling of the goods being transported (e.g. actively temperature controlled incubators) because the goods might include medicines, food and other perishables where temperature is a vital factor, along with the humidity and any shocks experienced along the way.

As in logistics, cold-chain logistics encompass activities beyond the transport chain. Of particular interest is the monitoring of "compliance" to the drug storage and regimen by the end user.

In another example, the journey finger print may be used to monitor the condition of assets such as agricultural or other industrial machinery, based on vibrational analysis in a similar manner to the telematics case mentioned above. In this case the journey fingerprint may be focussed on particular activity, behaviour or context classifications specific to typical uses of the machinery in question.

Active monitoring and control of tools and assets is an enhancement of this condition monitoring application. In this case both a real time feed and a journey fingerprint can be used to control the monitored devices proactively. The capture of "expected" journeys and the real-time comparison with the actual journey fingerprint is particularly beneficial.

For example, sensors could be used beneficially to monitor expensive mechanical machines (such as industrial drills) that are designed to last, on average, for a particular number of uses and after which, critical parts such as the drill-bit may fail and need to be replaced. Sensors which sense the number of uses, the way in which the tool is used, when a tool is heading towards failure, and incidents of abnormal behaviour can be used to allow predictive maintenance, possibly by servicing tools before failure to extend their life, and also to allow spares to be ordered so that time without a working tool is minimised.

Other systems where many apparatuses of the same type are expected to behave similarly, such as a set of train doors, wind-turbine blades within a wind-farm, conveyor belts etc. would all also benefit from increased monitoring using sensors, looking for 'out of pattern' behaviours (either relative to historical data from the same item, or relative to other items of the same type) to enable predictive maintenance or servicing.

It can be seen, therefore, that in addition (or as an alternative) to an improved monitoring apparatus, an improved method for managing data and/or an associated apparatus may also be provided.

In one example, for instance, there may be provided a method for managing data received from at least one sensor, the method comprising: obtaining, from the at least one sensor, sensor data representing events affecting a monitored object; processing the sensor data to identify the events, to determine a respective event type for each identified event, and to determine a respective background circumstance associated with each the event from a plurality of background circumstances of a common background circumstance type; outputting, to a user, in a first output stream, a respective representation of each identified event; and outputting, responsive to input from the user, in a different respective output stream for each background circumstance of the common background circumstance type, a respective representation of each the event with which the background circumstance is associated.

The processing may comprise processing the sensor data to determine a respective further background circumstance associated with each the event from a plurality of further background circumstances of a further common background circumstance type. The method may further comprise outputting, responsive to further input from the user, in a different respective output stream for each background circumstance of the further common background circumstance type, a respective representation of each the event with which the background circumstance is associated.

The background circumstance type may comprise at least one of the following: a first type in which each background circumstance represents an activity in which the monitored object is involved; a second type in which each background circumstance represents a behavioural circumstance related to the monitored object (e.g. individual or group of individuals responsible for the monitored object) at a time when the associated event occurred; and a third type in which each background circumstance represents a context in which an associated event takes place.

The background circumstance type may comprise a third type in which each background circumstance represents a context in which an associated event has taken place. The context may represent at least one of an environmental context (e.g. a temperature range or humidity range in which an associated event has taken place); a time context (e.g. a time of day in which an associated event has taken place); and a location context (e.g. a geographical location or region in which an associated event has taken place). Each background circumstance representing a context in which an associated event has taken place may represent any other context (which may be unrelated to environment, time of the event or the location of the event) such as, for example, historical context which depends on what has happened to the monitored object prior to the event, or any other appropriate context.

The processing may further comprise processing the sensor data to group events into a plurality of groups each event group comprising events of one or more different event types. The respective representation, of each event of a particular group, may share at least one common feature with each other representation of the events of that particular group.

The events may be grouped into a plurality of groups including an event group for significant events. The events may be grouped into a plurality of groups including an event group for events occurring during transportation of a first type and a further event group for events occurring during transportation of a second type.

The obtaining may obtain the sensor data representing events affecting a monitored object together with time data identifying a time associated with the event; may obtain the sensor data representing events affecting a monitored object together with location data (e.g. satellite positioning data) identifying a geographic location or region associated with the event; and/or may obtain the sensor data representing events affecting a monitored object together with environmental data (e.g. temperature and/or humidity data) identifying an environmental factor (e.g. a temperature and/or humidity) associated with the event.

Each identified event may be included in the first output stream in a chronological order; may be included in each the output stream in a chronological order; and/or may be output as a different respective visual stream on a display.

In one example, for instance, there may be provided apparatus for managing data received from at least one sensor, the apparatus comprising: means for obtaining, from the at least one sensor, sensor data representing events affecting a monitored object; means for processing the sensor data to identify the events, to determine a respective event type for each identified event, and to determine a respective background circumstance associated with each the event from a plurality of background circumstances of a common background circumstance type; and means for outputting, to a user, in a first output stream, a respective representation of each identified event, and for outputting, responsive to input from the user, in a different respective output stream for each background circumstance of the common background circumstance type, a respective representation of each the event with which the background circumstance is associated.

Various other modifications will be apparent to those skilled in the art and will not be described in further detail here.

The invention claimed is:

1. A monitoring apparatus for providing vehicle telematics data, the apparatus comprising:
   at least one sensor for sensing vehicle and engine motion induced vibration in part of a vehicle and for generating vibration associated data, the at least one sensor being adapted to be coupled to said part of said vehicle;
   a processor for processing said vehicle and engine motion induced vibration associated data to generate processed data representing at least one characteristic of said vehicle or engine; and
   a transceiver for communicating said processed data representing at least one characteristic of said vehicle or engine to a communication device for use in compiling telematics data for said vehicle;
   wherein the apparatus has a first data acquisition mode and a second data acquisition mode, power consumption of the apparatus being relatively higher in the second data acquisition mode than the first data acquisition mode;
   wherein said processor is configured to:
   identify at least one vehicle related event from said vehicle and engine motion induced vibration associated data;
   determine a respective vehicle related event type for each identified event;
   determine whether a change from one of the first and second data acquisition modes to the other of said first and second data acquisition modes should be triggered based on said determination of a respective event type for each identified event; and trigger said change from said one of the first and second data acquisition modes to the other of said first and second data acquisition modes when a determination is made that said change should be triggered;

wherein, in the second data acquisition mode, the apparatus is configured to do at least one action from the following group of actions:

read sensor data at an increased rate relative to the first data acquisition mode in order to gather sensor data;

send a communication signal at an increased rate relative to the first data acquisition mode for establishing a connection for transmitting data;

select a different power-management algorithm relative to the first data acquisition mode; and choose an alternative service flow/communication protocol method relative to the first data acquisition mode; and wherein said processor is configured to perform a preliminary analysis on acquired data, prior to storing any acquired data for subsequent transmission, and based on the analysis, to determine whether at least one specific event has occurred and based on a determination that the at least one specific event has occurred, to determine that the acquired data should be stored.

2. The monitoring apparatus according to claim 1, wherein the apparatus, by virtue of having a weight of less than 100 g, is sufficiently lightweight to allow the at least one sensor to sense said vehicle induced vibration in said part of said vehicle with sufficient sensitivity for the processor to detect, from said vehicle motion induced vibration, at least one event affecting said vehicle that occurs whilst the vehicle is stationary with the engine off.

3. The monitoring apparatus according to claim 1, wherein said apparatus comprises a power supply and wherein the apparatus has a weight of less than 100 g including said power supply.

4. The monitoring apparatus according to claim 1, wherein said processor is adapted to process said vibration associated data to provide processed data representing at least one characteristic of said vehicle or engine comprising at least one characteristic from the following group of characteristics: engine revolutions per minute (RPM), wheel RPM, currently engaged gear, idle frequency, stroke cycle, number of cylinders, vehicle speed, engine type and/or vehicle type.

5. The monitoring apparatus according to claim 1, wherein said processor is adapted to process said vibration associated data to provide said processed data representing at least one characteristic of said vehicle or engine in a format that requires further processing, by at least one of said communication device and another device to derive said characteristic of said vehicle or engine for use in compiling telematics data for said vehicle.

6. The monitoring apparatus according to claim 1, wherein said processor is adapted to detect at least one vehicle related event based on said vibration data.

7. The monitoring apparatus according to claim 1, wherein said at least one sensor is adapted to be coupled to, to sense vehicle and engine motion induced vibration in, and to generate vibration associated data for, a part of said vehicle comprising at least one from the following group of parts: a windshield, a body part, and/or a part of a vehicle chassis.

8. The monitoring apparatus according to claim 1, wherein said at least one sensor is adapted to sense vehicle motion in a plurality of different dimensions and to provide associated motion data for said plurality of different dimensions.

9. The monitoring apparatus according to claim 8, wherein said processor is adapted to derive an orientation of said motion data to a longitudinal axis representing vehicle motion in a forward/reverse direction and a lateral axis representing vehicle motion in a lateral direction when, in use, the vehicle begins to move after being stationary.

10. The monitoring apparatus according to claim 9, wherein said processor is adapted to maintain said orientation of said motion data to the longitudinal axis and the lateral axis for at least some future occasions when, in use, the vehicle begins to move after being stationary.

11. The monitoring apparatus according to claim 8, wherein said processor is adapted to derive an orientation of said motion data to a vertical axis based on a gravitational force.

12. The monitoring apparatus according to claim 1, wherein said at least one sensor is adapted to sense other vehicle motion and to output associated data; and said processor is adapted to process other vehicle motion associated data and to generate processed data representing at least one characteristic of said vehicle.

13. The monitoring apparatus according to claim 12, wherein said processor is adapted to process said other vehicle motion associated data to provide processed data representing at least one event affecting said vehicle, the at least one event comprising at least one event from the following group of events: an acceleration event, an impact event whilst the vehicle is stationary and the engine is off, a motion event whilst the vehicle is stationary and the engine is on, a door opening or closing event, and an impact whilst moving event; and wherein said transceiver is adapted to communicate said processed data representing at least one event affecting said vehicle to the communication device for use in compiling telematics data for said vehicle.

14. The method of monitoring vehicle telematics data using the monitoring apparatus of claim 1, the method comprising:

sensing, at the sensor of the monitoring apparatus, vehicle and engine motion induced vibration in part of a vehicle to which the sensor is coupled and generating vibration associated data;

processing, at the processor of the monitoring apparatus, said vehicle and engine motion induced vibration associated data to generate processed data representing at least one characteristic of said vehicle or engine; and communicating, using the transceiver of the monitoring apparatus, said processed data representing at least one characteristic of said vehicle or engine to a communication device for use in compiling telematics data for said vehicle.

15. The computer program product comprising computer implementable instructions for putting the method of claim 14 into effect when executed on a programmable device.

16. Monitoring apparatus for providing vehicle telematics data, the apparatus comprising: at least one sensor for sensing vehicle and engine motion induced vibration in part of a vehicle and for generating vibration associated data, the at least one sensor being adapted to be coupled to said part of said vehicle;

a processor for processing said vehicle and engine motion induced vibration associated data to generate processed data representing at least one characteristic of said vehicle or engine; and a transceiver for communicating said processed data representing at least one characteristic of said vehicle or engine to a communication device for use in compiling telematics data for said vehicle;

wherein the apparatus has a first data acquisition mode and a second data acquisition mode, the power consumption of the apparatus being relatively higher in the second data acquisition mode than the first data acquisition mode;

wherein said processor is configured to: identify at least one vehicle related event from said vehicle and engine motion induced vibration associated data; to determine a respective vehicle related event type for each identified event; to determine whether a change from one of the first and second data acquisition modes to the other of said first and second data acquisition modes should be triggered based on said determination of a respective event type for each identified event; and to trigger said change from said one of the first and second data acquisition modes to the other of said first and second data acquisition modes when it is determined that said change should be triggered;

wherein, in the second data acquisition mode, the apparatus is configured to do at least one action from the following group of actions: read sensor data at an increased rate relative to the first data acquisition mode in order to gather sensor data; send a communication signal at an increased rate relative to the first data acquisition mode for establishing a connection for transmitting data; select a different power-management algorithm relative to the first data acquisition mode; and choose an alternative service flow/communication protocol method relative to the first data acquisition mode; and wherein said processor is adapted to generate said processed data based on a frequency analysis of said vibration.

17. Monitoring apparatus for providing vehicle telematics data, the apparatus comprising: at least one sensor for sensing vehicle and engine motion induced vibration in part of a vehicle and for generating vibration associated data, the at least one sensor being adapted to be coupled to said part of said vehicle;

a processor for processing said vehicle and engine motion induced vibration associated data to generate processed data representing at least one characteristic of said vehicle or engine; and a transceiver for communicating said processed data representing at least one characteristic of said vehicle or engine to a communication device for use in compiling telematics data for said vehicle;

wherein the apparatus has a first data acquisition mode and a second data acquisition mode, the power consumption of the apparatus being relatively higher in the second data acquisition mode than the first data acquisition mode;

wherein said processor is configured to: identify at least one vehicle related event from said vehicle and engine motion induced vibration associated data; to determine a respective vehicle related event type for each identified event; to determine whether a change from one of the first and second data acquisition modes to the other of said first and second data acquisition modes should be triggered based on said determination of a respective event type for each identified event; and to trigger said change from said one of the first and second data acquisition modes to the other of said first and second data acquisition modes when it is determined that said change should be triggered;

wherein in the second data acquisition mode, the apparatus is configured to do at least one action from the following group of actions: read sensor data at an increased rate relative to the first data acquisition mode in order to gather sensor data; send a communication signal at an increased rate relative to the first data acquisition mode for establishing a connection for transmitting data; select a different power-management algorithm relative to the first data acquisition mode; and choose an alternative service flow/communication protocol method relative to the first data acquisition mode; and wherein the processor is configured to: generate a profile of data from the sensor; wherein said triggering of a change from said one of the first and second data acquisition modes to the other of said first and second data acquisition modes comprises triggering a power management component configured to vary a duty cycle in dependence upon said profile between said one of the first and second data acquisition modes and the other of said first and second data acquisition modes.

18. Monitoring apparatus for providing vehicle telematics data, the apparatus comprising: at least one sensor for sensing vehicle and engine motion induced vibration in part of a vehicle and for generating vibration associated data, the at least one sensor being adapted to be coupled to said part of said vehicle;

a processor for processing said vehicle and engine motion induced vibration associated data to generate processed data representing at least one characteristic of said vehicle or engine; and a transceiver for communicating said processed data representing at least one characteristic of said vehicle or engine to a communication device for use in compiling telematics data for said vehicle;

wherein the apparatus has a first data acquisition mode and a second data acquisition mode, the power consumption of the apparatus being relatively higher in the second data acquisition mode than the first data acquisition mode;

wherein said processor is configured to: identify at least one vehicle related event from said vehicle and engine motion induced vibration associated data; to determine a respective vehicle related event type for each identified event; to determine whether a change from one of the first and second data acquisition modes to the other of said first and second data acquisition modes should be triggered based on said determination of a respective event type for each identified event; and to trigger said change from said one of the first and second data acquisition modes to the other of said first and second data acquisition modes when a determination is made that said change should be triggered;

wherein, in the second data acquisition mode, the apparatus is configured to do at least one action from the following list of actions: read sensor data at an increased rate relative to the first data acquisition mode in order to gather sensor data; send a communication signal at an increased rate relative to the first data acquisition mode for establishing a connection for transmitting data; select a different power-management algorithm relative to the first data acquisition mode; and choose an alternative service flow/communication protocol method relative to the first data acquisition mode; and wherein said processor is configured to determine when an acceleration threshold has been exceeded, and to trigger said change from said one of the first and second data acquisition modes to the other of said first and second data acquisition modes, when a determination is made that an acceleration threshold has been exceeded.

19. Monitoring apparatus for providing vehicle telematics data, the apparatus comprising: at least one sensor for sensing vehicle and engine motion induced vibration in part of a vehicle and for generating vibration associated data, the at least one sensor being adapted to be coupled to said part of said vehicle;
 a processor for processing said vehicle and engine motion induced vibration associated data to generate processed data representing at least one characteristic of said vehicle or engine; and
 a transceiver for communicating said processed data representing at least one characteristic of said vehicle or engine to a communication device for use in compiling telematics data for said vehicle;
 wherein the apparatus has a first data acquisition mode and a second data acquisition mode, the power consumption of the apparatus being relatively higher in the second data acquisition mode than the first data acquisition mode;
 wherein said processor is configured to: identify at least one vehicle related event from said vehicle and engine motion induced vibration associated data; to determine a respective vehicle related event type for each identified event; to determine whether a change from one of the first and second data acquisition modes to the other of said first and second data acquisition modes should be triggered based on said determination of a respective event type for each identified event; and to trigger said change from said one of the first and second data acquisition modes to the other of said first and second data acquisition modes when a determination is made that said change should be triggered;
 wherein, in the second data acquisition mode, the apparatus is configured to do at least one action from the following list of actions: read sensor data at an increased rate relative to the first data acquisition mode in order to gather sensor data; send a communication signal at an increased rate relative to the first data acquisition mode for establishing a connection for transmitting data; select a different power-management algorithm relative to the first data acquisition mode; and choose an alternative service flow/communication protocol method relative to the first data acquisition mode; and
 wherein said processor is configured to determine an orientation of at least one accelerometer axis, relative to at least one axis of the vehicle, before generating processed data based on acceleration thresholds that are respectively different in different directions.

* * * * *